United States Patent
Lambarth et al.

(10) Patent No.: US 10,441,483 B2
(45) Date of Patent: Oct. 15, 2019

(54) EMERGENCY PATIENT MOTION SYSTEM

(71) Applicant: Stryker Corporation, Kalamazoo, MI (US)

(72) Inventors: Clifford Edwin Lambarth, Portage, MI (US); Chad Conway Souke, Vicksburg, MI (US); Alfred James Dacey, IV, Mendon, MI (US); Jason James Wroblewski, Kalamazoo, MI (US); Brandon David Naber, Portage, MI (US); Ross Timothy Lucas, Paw Paw, MI (US); Daniel Vincent Brosnan, Kalamazoo, MI (US); Aaron Douglas Furman, Kalamazoo, MI (US); Christopher J. Cummings, Portage, MI (US); Janani Gopalkrishnan, Portage, MI (US); Thomas Alan Puvogel, Kalamazoo, MI (US); Genevieve Cherie Sertic, Portage, MI (US)

(73) Assignee: STRYKER CORPORATION, Kalamazoo, MI (US)

( * ) Notice: Subject to any disclaimer, the term of this patent is extended or adjusted under 35 U.S.C. 154(b) by 0 days.

(21) Appl. No.: 15/653,773

(22) Filed: Jul. 19, 2017

(65) Prior Publication Data

US 2018/0021191 A1  Jan. 25, 2018

Related U.S. Application Data

(60) Provisional application No. 62/364,605, filed on Jul. 20, 2016.

(51) Int. Cl.
*A61G 3/06* (2006.01)
*A61G 1/02* (2006.01)
(Continued)

(52) U.S. Cl.
CPC ............... *A61G 3/06* (2013.01); *A61G 1/02* (2013.01); *A61G 1/04* (2013.01); *A61G 5/047* (2013.01);
(Continued)

(58) Field of Classification Search
CPC ...... A61G 3/06; A61G 7/1019; A61G 7/1025; A61G 7/1046; A61G 7/1057; A61G 2200/32
(Continued)

(56) References Cited

U.S. PATENT DOCUMENTS

| 4,665,573 A | 5/1987 | Fiore |
| 4,876,490 A | 10/1989 | Kolb |

(Continued)

FOREIGN PATENT DOCUMENTS

| CA | 2529091 A1 | 12/2003 |
| CA | 2393880 A1 | 1/2004 |

(Continued)

OTHER PUBLICATIONS

Troy-Bilt LLC, "Troy-Bilt Flex, A Whole New Approach to Yard Care", URL: http://www.troybilt.com/equipment/troybilt/flex.
(Continued)

*Primary Examiner* — James M Dolak
*Assistant Examiner* — Brian L Cassidy
(74) *Attorney, Agent, or Firm* — Howard & Howard Attorneys PLLC

(57) ABSTRACT

A modular drive device for driving a first driven module of a first emergency patient motion device or a second driven module of a second emergency patient motion device, the first driven module being different from the second driven module. The modular drive device comprises a motor, and an output device operatively coupled to and drivable by the motor. The output device transmits mechanical force from (Continued)

the motor to the first driven module when said output device is coupled to the first emergency patient motion device and from the motor to the second driven module when said output device is coupled to the second emergency patient motion device. The modular drive device further comprises a controller operable in a first motor mode and a second motor mode. The first motor mode corresponding to the first driven module, and the second motor mode corresponding to the second driven module.

12 Claims, 15 Drawing Sheets

(51) Int. Cl.
  A61G 1/04 (2006.01)
  A61G 5/04 (2013.01)
  A61G 5/06 (2006.01)
  A61G 7/10 (2006.01)
  H02K 7/116 (2006.01)
  A61G 5/10 (2006.01)

(52) U.S. Cl.
  CPC ............ *A61G 5/061* (2013.01); *A61G 5/10* (2013.01); *A61G 7/1019* (2013.01); *A61G 7/1025* (2013.01); *H02K 7/116* (2013.01); *A61G 7/1046* (2013.01); *A61G 7/1057* (2013.01); *A61G 2200/32* (2013.01)

(58) Field of Classification Search
  USPC ........................................................ 180/65.1
  See application file for complete search history.

(56) References Cited

U.S. PATENT DOCUMENTS

| | | | |
|---|---|---|---|
| 5,033,552 A * | 7/1991 | Hu | B25B 21/00 173/170 |
| 5,095,562 A | 3/1992 | Alexander | |
| 5,495,904 A * | 3/1996 | Zwaan | A61G 5/045 180/11 |
| 5,563,482 A * | 10/1996 | Shaw | B23P 19/066 173/176 |
| 5,579,547 A | 12/1996 | Hunt | |
| 5,624,000 A * | 4/1997 | Miller | B25F 5/001 173/104 |
| 5,898,288 A | 4/1999 | Rice et al. | |
| 6,263,980 B1 * | 7/2001 | Wadge | B25F 3/00 173/170 |
| 6,334,442 B1 | 1/2002 | Altamura | |
| 6,702,051 B2 * | 3/2004 | Chu | A61G 5/047 180/13 |
| 6,729,422 B2 * | 5/2004 | Chu | A61G 5/047 180/13 |
| 7,021,399 B2 * | 4/2006 | Driessen | B25F 3/00 173/216 |
| 7,065,816 B2 | 6/2006 | McGettigan | |
| 7,111,338 B2 * | 9/2006 | Faux | A61G 7/1019 5/81.1 C |
| 7,114,204 B2 * | 10/2006 | Patrick | A61G 7/1021 5/81.1 R |
| 7,359,628 B2 * | 4/2008 | Broghammer | B25F 5/02 200/522 |
| 7,570,152 B2 | 8/2009 | Smith et al. | |
| 7,690,056 B2 | 4/2010 | Moffa et al. | |
| 7,690,059 B2 | 4/2010 | Lemire et al. | |
| 7,702,481 B2 | 4/2010 | Dionne et al. | |
| 7,735,164 B1 * | 6/2010 | Patrick | A61G 7/1021 5/710 |
| 7,774,215 B2 | 8/2010 | Rosow et al. | |
| 7,856,758 B2 | 12/2010 | Ressel et al. | |
| 7,882,899 B2 * | 2/2011 | Borinato | B23B 45/008 173/176 |
| 8,011,039 B2 | 9/2011 | Stryker et al. | |
| 8,060,274 B2 | 11/2011 | Boss et al. | |
| 8,121,856 B2 | 2/2012 | Huster et al. | |
| 8,276,222 B1 * | 10/2012 | Patrick | A61G 7/1046 5/713 |
| 8,334,779 B2 | 12/2012 | Zerhusen et al. | |
| 8,640,798 B2 * | 2/2014 | Walkingshaw | A61G 5/066 180/9.32 |
| 8,756,078 B2 | 6/2014 | Collins, Jr. et al. | |
| 8,757,308 B2 | 6/2014 | Bhai et al. | |
| 8,914,924 B2 | 12/2014 | Stryker et al. | |
| 9,004,204 B2 * | 4/2015 | Walkingshaw | A61G 5/066 180/9.32 |
| 9,079,505 B1 | 7/2015 | Hyde et al. | |
| 9,123,229 B2 | 9/2015 | Slavin et al. | |
| 9,217,535 B1 * | 12/2015 | Egan | A61G 3/02 |
| 9,230,421 B2 | 1/2016 | Reeder et al. | |
| 9,248,065 B1 * | 2/2016 | Tu | B62B 3/022 |
| 9,393,698 B1 * | 7/2016 | Vo | A61G 5/04 |
| 9,539,156 B2 | 1/2017 | Lemire et al. | |
| 9,569,591 B2 | 2/2017 | Vanderpohl, III | |
| 9,642,759 B2 | 5/2017 | Stryker et al. | |
| 9,713,728 B2 | 7/2017 | Smith | |
| 9,863,577 B1 * | 1/2018 | Egan | F16M 13/02 |
| 2002/0029418 A1 * | 3/2002 | Votel | A61G 7/1019 5/81.1 RP |
| 2002/0151990 A1 | 10/2002 | Ulrich et al. | |
| 2003/0089537 A1 * | 5/2003 | Sinclair | A61G 5/047 180/65.1 |
| 2003/0132585 A1 * | 7/2003 | Way | A61G 5/061 280/5.22 |
| 2004/0050603 A1 * | 3/2004 | Jaeger | B62K 3/002 180/181 |
| 2004/0172182 A1 | 9/2004 | Pathare | |
| 2005/0113996 A1 | 5/2005 | Pillar et al. | |
| 2006/0049936 A1 | 3/2006 | Collins et al. | |
| 2006/0136105 A1 | 6/2006 | Larson | |
| 2006/0156468 A1 * | 7/2006 | Patrick | A61G 7/1021 5/81.1 R |
| 2007/0010719 A1 | 1/2007 | Huster et al. | |
| 2007/0174964 A1 | 8/2007 | Lemire et al. | |
| 2007/0182220 A1 * | 8/2007 | Walkinshaw | A61G 1/013 297/118 |
| 2007/0210917 A1 | 9/2007 | Collins et al. | |
| 2007/0251738 A1 * | 11/2007 | Wachendorf | B62M 6/60 180/65.1 |
| 2008/0067762 A1 * | 3/2008 | Rembos | A61G 5/02 280/5.22 |
| 2008/0312971 A2 | 12/2008 | Rosow et al. | |
| 2009/0063183 A1 | 3/2009 | McNeely et al. | |
| 2009/0064417 A1 | 3/2009 | Garman | |
| 2009/0088924 A1 | 4/2009 | Coffee et al. | |
| 2009/0165204 A1 * | 7/2009 | Biersteker | A61G 7/1017 5/87.1 |
| 2010/0084535 A1 * | 4/2010 | Cvek | A47B 21/007 248/404 |
| 2010/0117039 A1 | 5/2010 | Perrett et al. | |
| 2010/0117312 A1 * | 5/2010 | Walkingshaw | A61G 5/066 280/5.22 |
| 2011/0056177 A1 * | 3/2011 | Goto | B62M 6/55 56/14.7 |
| 2011/0208541 A1 | 8/2011 | Wilson et al. | |
| 2011/0301807 A1 | 12/2011 | Staaf | |
| 2012/0123951 A1 | 5/2012 | Hyatt et al. | |
| 2012/0137436 A1 | 6/2012 | Andrienko | |
| 2012/0317715 A1 * | 12/2012 | Corriveau | A61G 7/1017 5/86.1 |
| 2013/0025950 A1 * | 1/2013 | Brandon | B60K 1/04 180/65.1 |
| 2013/0142367 A1 | 6/2013 | Berry et al. | |
| 2013/0191032 A1 | 7/2013 | Marquardt et al. | |
| 2013/0249458 A1 | 9/2013 | Abou-Kasm et al. | |
| 2014/0080413 A1 | 3/2014 | Hayes et al. | |
| 2014/0090914 A1 * | 4/2014 | Walkingshaw | A61G 5/066 180/190 |

(56) References Cited

U.S. PATENT DOCUMENTS

| | | |
|---|---|---|
| 2014/0259414 A1 | 9/2014 | Hayes et al. |
| 2014/0297327 A1 | 10/2014 | Heil et al. |
| 2014/0320290 A1 | 10/2014 | Reeder et al. |
| 2014/0374680 A1* | 12/2014 | Tsang .................... B66F 7/0658 254/7 C |
| 2015/0075883 A1* | 3/2015 | Ward ..................... A63C 17/12 180/65.6 |
| 2015/0115638 A1 | 4/2015 | Lambarth et al. |
| 2015/0135436 A1 | 5/2015 | Stryker et al. |
| 2015/0150741 A1* | 6/2015 | Shi ....................... A61G 7/1001 5/83.1 |
| 2015/0239365 A1 | 8/2015 | Hyde et al. |
| 2015/0281659 A1 | 10/2015 | Hood et al. |
| 2016/0013837 A1 | 1/2016 | Howell et al. |
| 2016/0259906 A1 | 9/2016 | Iucha et al. |
| 2016/0283681 A1 | 9/2016 | Falck et al. |
| 2016/0331614 A1 | 11/2016 | Furman et al. |
| 2017/0098048 A1 | 4/2017 | Brosnan et al. |
| 2018/0000675 A1* | 1/2018 | Heneveld, Jr. ......... A61G 7/018 |
| 2018/0161225 A1 | 6/2018 | Zerhusen et al. |

FOREIGN PATENT DOCUMENTS

| | | |
|---|---|---|
| EP | 553372 A1 | 8/1993 |
| KR | 20130076922 A | 7/2013 |
| WO | 9834577 A1 | 8/1998 |
| WO | 2004021952 A2 | 3/2004 |

OTHER PUBLICATIONS

English language abstract and machine-assisted translation for KR20130076922 extracted from espacenet.com on Mar. 23, 2018; 5 pages.

Hovertech International, "Safe Bariatric Patient Handling", Jul. 2013; 2 pages.

Stryker Corporation, "Cordless Driver 4 & SABO 2" Brochure, 2013; 1 page.

\* cited by examiner

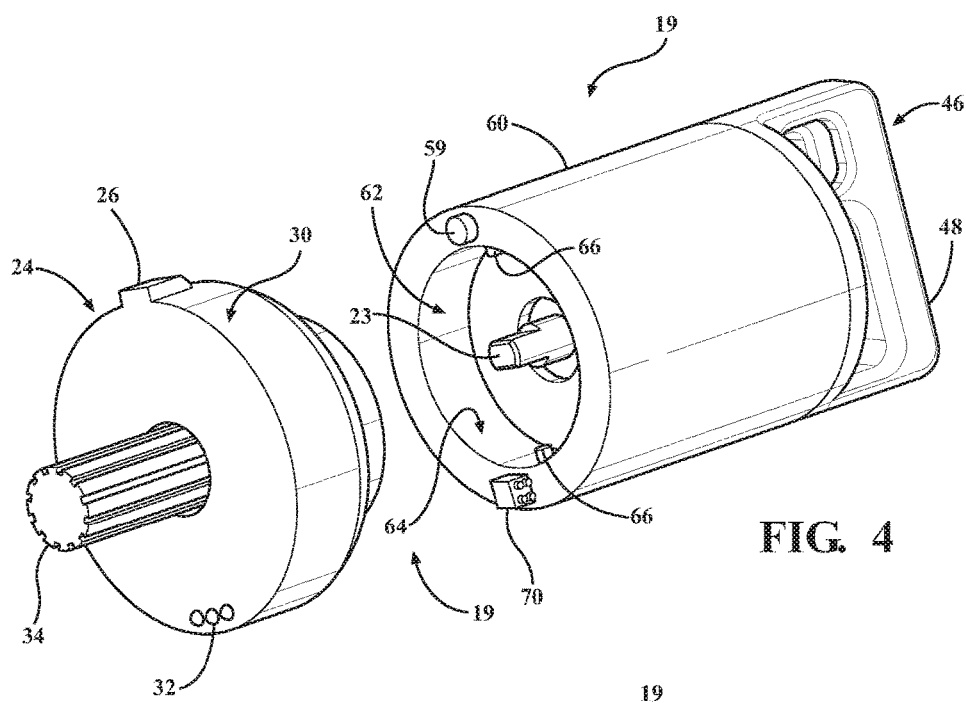
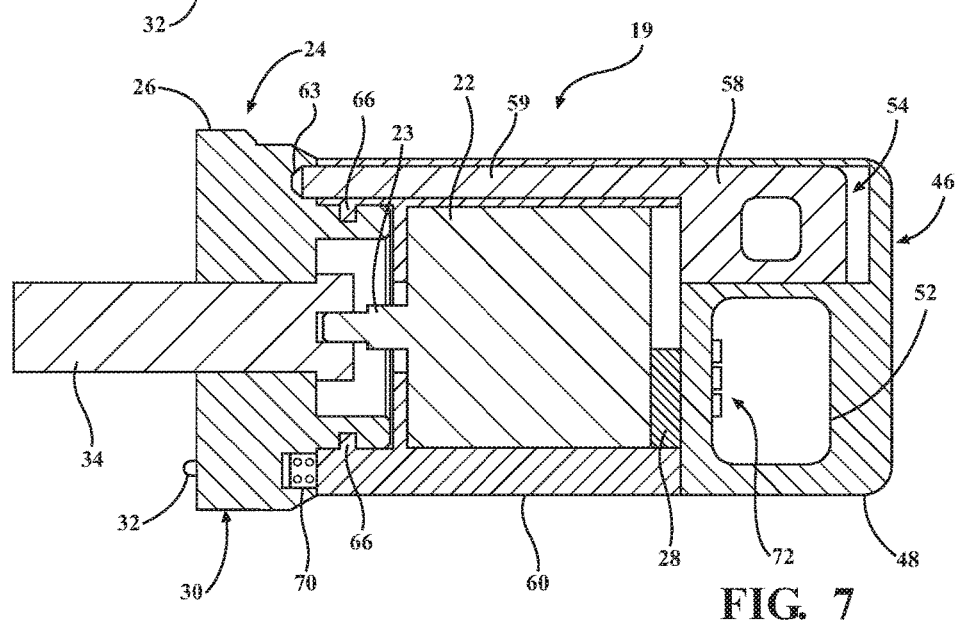

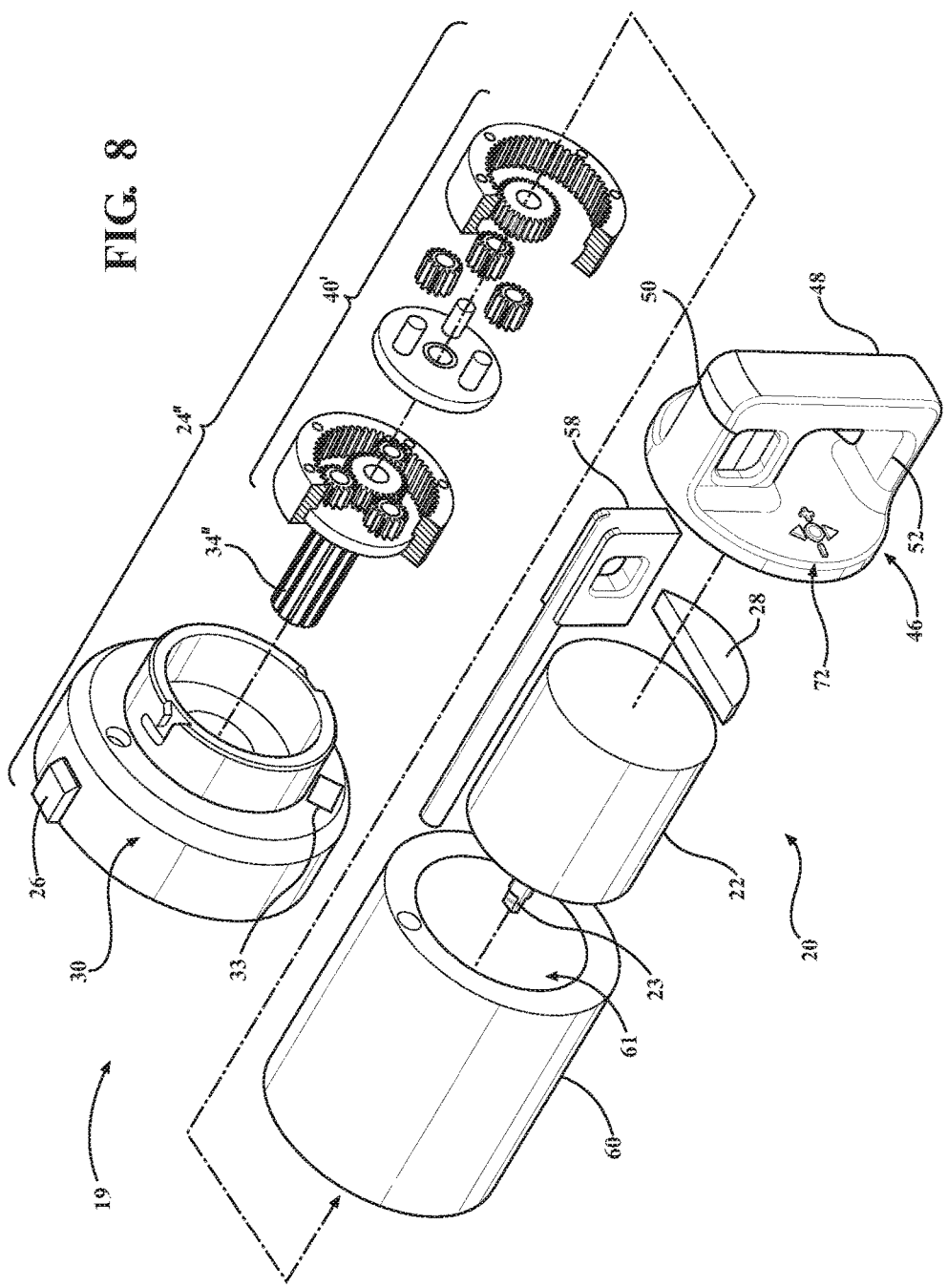

EMERGENCY PATIENT MOTION SYSTEM

CROSS-REFERENCE TO RELATED APPLICATION

The subject patent application claims priority to and all the benefits of U.S. Provisional Patent Application Ser. No. 62/364,605 which was filed on Jul. 20, 2016, the disclosure of which is hereby incorporated by reference.

BACKGROUND

On emergency transport vehicles, such as ambulances, emergency response personnel must be able to respond to a variety of emergency scenarios. This requires having access to multiple emergency patient motion devices, each configured to move patients in a different manner, depending on the circumstances of the emergency scenario. While certain emergency patient motion devices may be motorized to assist emergency response personnel in moving patients, these emergency patient motion devices each include a separate dedicated motor, battery, and related components. When a multitude of these motors, batteries, and related components are hauled onboard emergency transport vehicles, space and weight limits may be compromised. Thus, there exists a need for an emergency patient motion system that is compatible with the weight and space limitations of emergency transport vehicles.

BRIEF DESCRIPTION OF THE DRAWINGS

Advantages of the present invention will be readily appreciated as the same becomes better understood by reference to the following detailed description when considered in connection with the accompanying drawings.

FIG. 4 is a partially exploded view of the back of the modular drive assembly of FIG. 3, showing the output device spaced apart from the energy storage device, the motor, and the housing.

FIG. 7 is a cross-sectional view of the modular drive assembly of FIG. 2.

FIG. 8 is an exploded view of another embodiment of a modular drive assembly showing an output device having a transmission, an energy storage device, a motor, a finger latch, and a housing spaced apart from one another.

DETAILED DESCRIPTION

Figure 1:
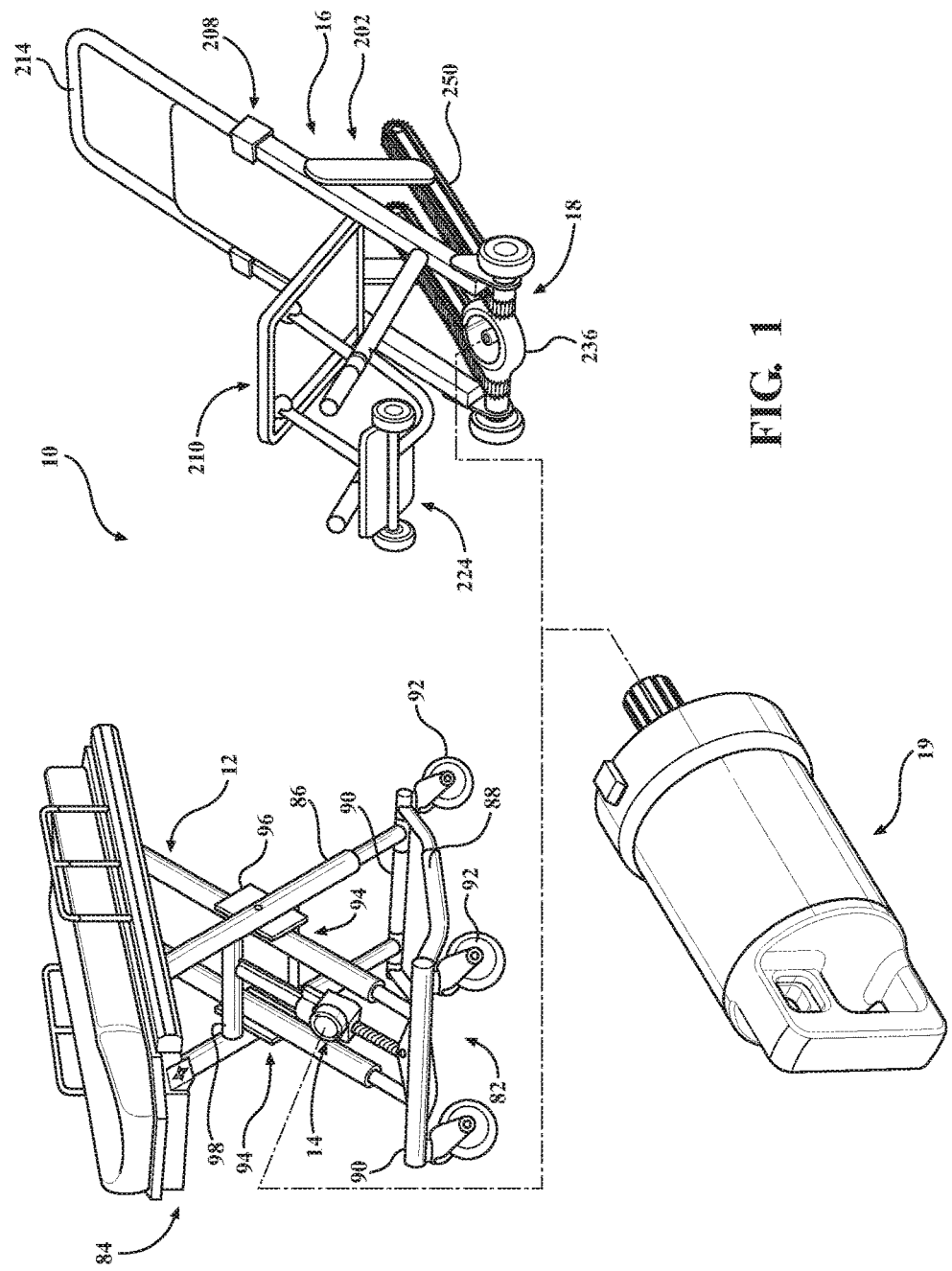
FIG. 1 is an exemplary emergency patient motion system according to one embodiment, the emergency patient motion system including a first emergency patient motion device, a second emergency patient motion device, and a modular drive assembly.

Certain terminology will be used in the following description for convenience in reference only and will not be limiting. The words "up", and "down", "right" and "left" will designate directions in the drawings to which reference is made. The words "in" and "out" will refer to directions toward and away from, respectively, the geometric center of the patient support apparatus and designated parts thereof. Such terminology will include derivatives and words of similar import.

An emergency patient motion system 10, as illustrated in FIG. 1, comprises a first emergency patient motion device 12 comprising a first driven module 14, and a second emergency patient motion device 16 comprising a second driven module 18. The emergency patient motion system 10 further comprises a modular drive assembly 19 that comprises a modular drive device for driving either the first driven module 14 of the first emergency patient motion device 12 or the second driven module 18 of the second emergency patient motion device 16 when the modular drive device is coupled to either the first or second emergency patient motion devices 12, 16, respectively.

In the illustrated embodiment, the first emergency patient motion device 12 is a stretcher and the second emergency patient motion device 16 is a stair climber. It should be appreciated that the type of emergency patient motion devices utilized in the emergency patient motion system 10 is not particularly limited. For example, the first and second emergency patient motion devices 12, 16 may each be independently selected from the group comprising a stretcher, a stair climber, a patient lift, a patient transfer device, a cot loader, and a walker. Furthermore, as illustrated, the type of each of the first and second emergency patient motion devices 12, 16 may differ from one another so long as each is capable of moving a patient.

It should also be appreciated that the first emergency patient motion device 12 and the second emergency patient motion device 16 may be of the same type as one another, e.g., a stretcher, but may have different characteristics. For example, in an emergency patient motion system that includes two stretchers, the first stretcher may have a different weight capacity from the other stretcher, may have different functionality from the other stretcher, such as being capable of moving into different positions from the other stretcher, or may simply be constructed differently from the other stretcher. Of course, the emergency patient motion system may include two of the same types of emergency patient motion devices.

Each of first emergency patient motion device 12 and the second emergency patient motion device 16 comprises a driven module 14, 18. Each driven module 14, 18 is movable to perform a patient motion function. The patient motion function performed by each driven module 14, 18 is not particularly limited and may comprise lifting a patient relative to a floor (via a lift device), loading a patient on a cot, tilting a patient relative to the floor (in the head-to-toe direction), turning the patient laterally relative to the floor (from side-to-side), and combinations thereof. Another exemplary patient motion function may comprise transferring the patient between a first patient support apparatus and a second patient support apparatus, or moving the patient across the floor with one or more powered wheel assemblies, or powered track assemblies. Furthermore, it is contemplated that each emergency patient motion device may independently comprise two, three or more driven modules, depending on the patient motion functions desired. For example, a single emergency patient motion device may alternatively comprise two driven modules, one driven module to lift the patient (such as a lift mechanism), and the other driven module configured to move the patient up and/or down stairs (such as a track assembly). The types and configurations of driven modules used in the emergency patient motion devices are not particularly limited, and may comprise any device or system that can be powered by one or more modular drive devices. By way of a non-limiting example, the driven module may comprise a transmission (not shown) comprising gears, sprockets, pulleys, a screw drive, a mechanical linkage such as a crankshaft, a pump, a compressor, etc.

With specific reference to FIG. 1, the first emergency patient motion device 12 comprises the first driven module 14. The first driven module 14 comprises a lift assembly 14 that operates to raise and lower the patient relative to the floor. On the other hand, the second emergency patient motion device 16 comprises a second driven module 18. The second driven module 18 comprises a track assembly 18 that propels the patient up and/or down a staircase.

Each of the driven modules 14, 18 has one or more drive requirements corresponding to the patient motion function that the respective driven module 14, 18 performs and the mechanism by which the driven module 14, 18 operates. The drive requirements may comprise a power requirement, a speed requirement, a torque requirement, or combinations thereof. For example, a first drive requirement may be a speed threshold, i.e., rotations per minute, that corresponds to a predetermined speed at which the first driven module 14 of the first emergency patient motion device 12 functions to lift the patient relative to the floor. In other words, if it is desired that the first driven module 14 is capable of lifting the patient at a certain speed, the first drive requirement corresponds to the power, torque, or speed that the first driven module 14 must receive from the modular drive device 20 to achieve that certain speed.

As illustrated in FIG. 1, the first emergency patient motion device 12 and the second emergency patient motion device 16 each move the patient in a different manner, i.e., the first emergency patient motion device 12 moves the patient vertically relative to the floor, whereas the second emergency patient motion device 16 moves the patient both vertically and horizontally relative to the floor (i.e., a manner suitable to climb stairs). As such, the drive requirements of the first driven module 14 may be different than the drive requirements of the second driven module 18 because the lift assembly 14 of the first emergency patient motion device 12 may require more power, speed, or torque to lift the patient relative to the floor than the track assembly 18 requires to move the patient up and/or down the stairs, or vice versa.

Accordingly, the first driven module 14 and the second driven module 18 may have different drive requirements corresponding to the patient motion function performed by the first and second emergency patient motion devices 12, 16, respectively. This is due to the fact that the driven modules 14, 18 typically have different power, torque, or speed requirements based on the different motion that the devices are designed to perform and/or the configuration of the driven modules 14, 18 designed to achieve that motion. Of course, in certain embodiments, it is also contemplated that the emergency patient motion system 10 may include two or more emergency patient motion devices that are each configured to perform a different patient motion function, but yet have similar or identical drive requirements in at least one of power, speed, or torque requirements.

Figure 12:
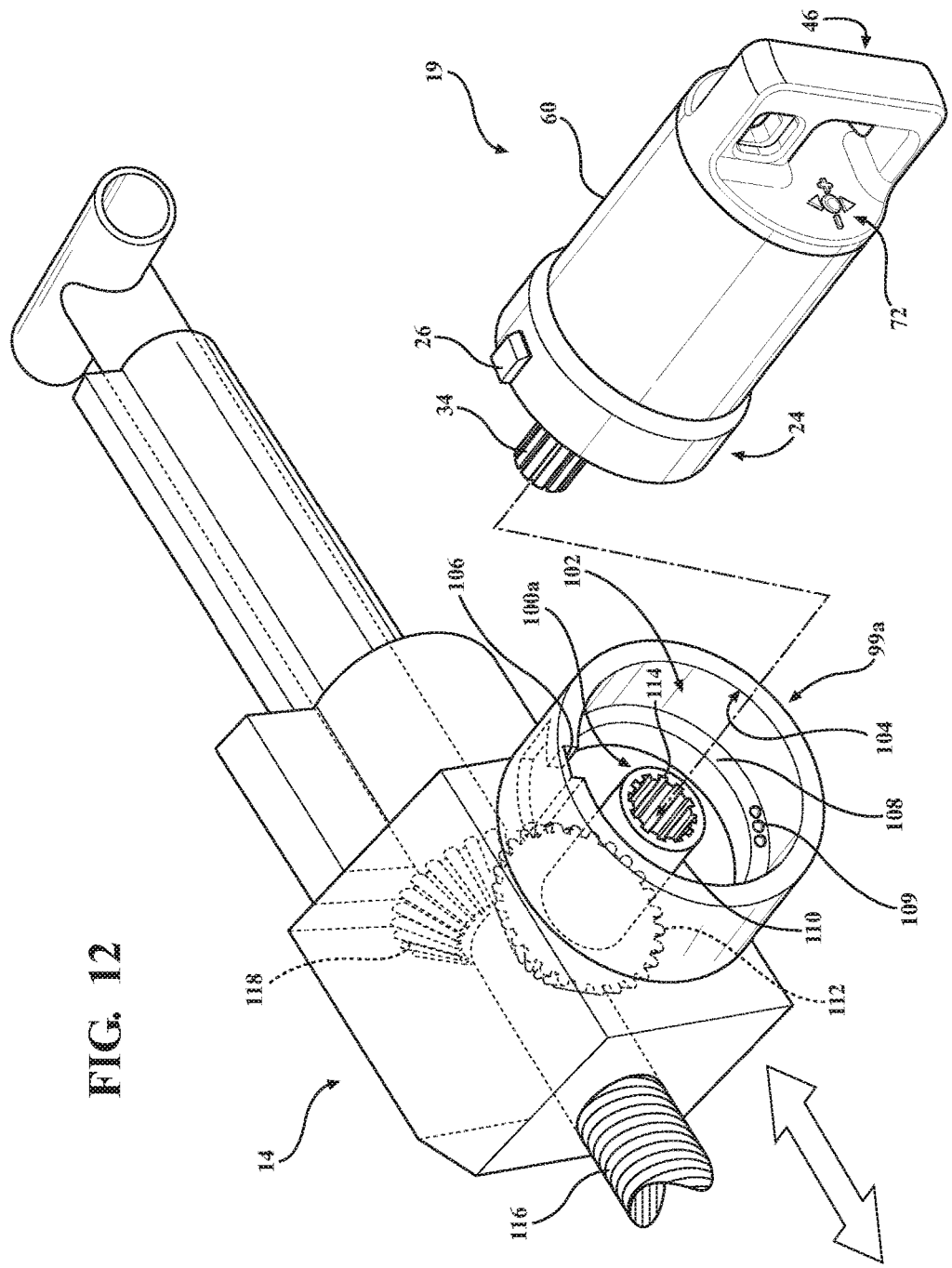
FIG. 12 is a close-up perspective view of a first driven module for the first emergency patient motion device of FIG. 11A, with the modular drive assembly of FIG. 1 spaced apart from one another.

FIG. 12 shows a cut-away perspective view of one exemplary embodiment of the first driven module 14 of FIG. 1. The first driven module 14 comprises a drive mount 99a and a drive member 100a. Generally, the drive member 100a receives mechanical energy from the modular drive device in order for the first driven module 14 to perform the designated patient motion function, in this case, lifting the patient relative to the floor.

The drive mount 99a functions to removably couple the modular drive device to the drive member 100a. In the illustrated embodiment, the drive mount 99a defines a cavity 102 and an inner surface 104. A bayonet slot 106 is defined in the inner surface 104 of the cavity 102. The bayonet slot 106 is generally L-shaped and configured to cooperate with features of the modular drive device 20 to removably retain the modular drive assembly 19 in a coupled configuration with the first driven module 14. The cavity 102 further comprises a shoulder 108. An electrical connector 109 may be disposed within a void on the shoulder 108 of the drive mount 99a and be configured to cooperate with a compatible electrical connector positioned on the modular drive device. Of course, other configurations of the drive mount are contemplated.

FIGS. 2-7 illustrate the first embodiment of the modular drive assembly 19 in greater detail. The modular drive assembly 19 comprises the modular drive device. The modular drive device is configured to be removably coupled to either the first or second emergency patient motion devices. As such, the modular drive device drives the first driven module when the modular drive device is coupled to the first emergency patient motion device and the modular drive device drives the second driven module when the modular drive device is coupled to the second emergency patient motion device. Said differently, the modular drive device is transferable between the first and second emergency patient motion devices to drive the first and second driven modules, respectively.

Figure 5:
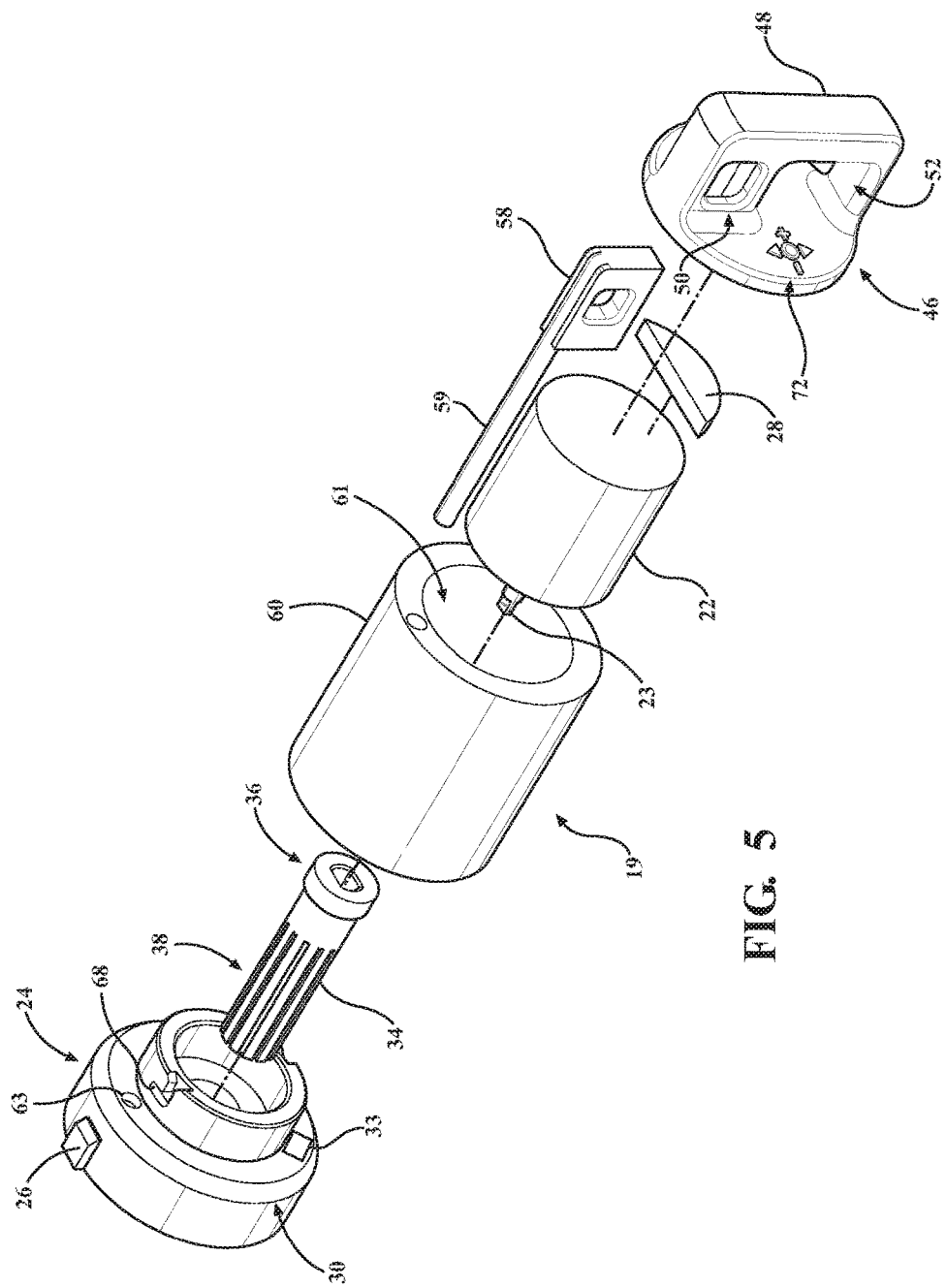
FIG. 5 is a further exploded view of the modular drive assembly of FIG. 3 from a front perspective.

As shown in FIG. 5, the exemplary modular drive device comprises a motor 22, an output device 24, and, optionally, a mount coupler 26. The modular drive device 20 may be further coupled to an energy storage device to form the modular drive assembly 19, as will be discussed below. In one configuration, the motor 22 is an electric motor powered by either alternating current (AC) or direct current (DC). Specifically, the motor 22 may be a brushless DC motor, a brushed DC motor, a stepper motor, or a solenoid. However, other types of motors are also contemplated.

The motor 22 should be broadly understood as a type of actuator that is capable of moving or controlling a mechanism or a system. While the described embodiments are electric motors, it should be understood that any type of actuator could also be used in certain applications. As such, motor 22 refers to electrical, hydraulic, or pneumatic actuators. Thus, motor 22 comprises actuators that cause linear or rotational movement, that cause movement of a fluid, and the like. The motor 22 may be any suitable size or power rating. The patient motion system may include two or more motors, each motor being different from the other. Those motors may be the same size as one another, such that all motors in a given patient motion system fit within the same housing. The motor 22 may be interchangeable with other motors (not shown) having different operation parameters corresponding to the drive requirements of the driven module. By way of non-limiting example, larger motors with greater power may power the driven module such that the patient motion function is performed faster, or with a greater capacity. Alternatively, smaller motors with less power may offer increased battery life and less weight.

Referring now to FIG. 4, the motor 22 comprises a motor shaft 23. When powered, the motor 22 operates to rotate the motor shaft 23. In the illustrated embodiment, the motor 22 is operatively coupled to the output device 24 to form the modular drive device 20. The motor shaft 23 is shaped to engage the output device 24 to apply an input force to the output device 24 upon rotation of the motor shaft 23 by the motor 22. The motor shaft 23 may be any suitable shape or configuration capable of transferring torque from the motor 22. The patient motion system may include two or more different motor shafts, with each configured differently from one another (i.e., have a different shape, different diameter, etc.).

Referring again to FIG. 5, the motor 22 may be operatively coupled to a controller 28. The controller 28 is configured to transmit an output signal to the motor 22 to control the operation of the motor 22. The controller 28 may assume any suitable configuration, and may control the operation parameter of the motor 22 in certain embodiments. For example, the controller 28 may control the amount of power supplied to the motor 22, which of course, influences the output characteristic of the motor shaft 23.

In configurations where the motor 22 is powered with a direct current power source, the controller 28 may be configured to provide a pulse width modulation signal. The application of the pulse width modulation signal may be used to control the effective voltage supplied by the source of power to the motor 22. In such a configuration, by controlling the effective voltage supplied to the motor 22, the controller 28 may control the speed of the motor 22. The voltage and/or current may also be regulated using other available techniques, and the controller 28 may utilize these other techniques to control a rate of operation of the motor 22.

In configurations where the power supplied to the motor 22 is an alternating current power source, the controller 28 may be coupled to the source of power and be further configured to control the amplitude and/or frequency of the alternating current provided to the motor 22. Thus, by controlling the amplitude and/or frequency of the alternating current supplied to the motor 22, the controller 28 may control the operation parameter of the motor 22.

The controller 28 may comprise one or more microprocessors for processing instructions or for processing an algorithm stored in memory to control operation of the motor 22. Additionally or alternatively, the controller 28 may comprise one or more microcontrollers, field programmable gate arrays, systems on a chip, discrete circuitry, and/or other suitable hardware, software, or firmware that is capable of carrying out the functions described herein.

In other embodiments, it is contemplated that the modular drive assembly may be free of an output device. In such configurations, the motor shaft 23 may be configured to directly engage the first and second driven modules 14, 18.

Referring again to FIG. 4, the motor and the motor shaft 23 cooperate to exhibit an operation parameter that quantifies the output characteristic of the motor shaft 23. The operation parameter may be a speed, a torque, a direction, and combinations thereof. In other words, the operation parameter may be representative of the characteristics of the force transmitted by motor shaft 23 to the output device 24 (or, in certain embodiments, to the driven modules).

As described above, the output device 24 is selectively coupled to and drivable by the motor. More particularly, in one embodiment, the output device 24 receives rotary mechanical force from the motor shaft 23, and output device 24 transmits mechanical force to the first driven module when modular drive assembly 19 is coupled to the first emergency patient motion device. Of course, the output device 24 is also configured to transmit mechanical force from the motor 22 to the second driven module when the modular drive assembly is coupled to the second emergency patient motion device.

Referring again to FIG. 7, the output device 24 converts the operation parameter of the motor shaft 23 to the drive requirements of the driven module. In other words, the output device 24 may change the characteristics of the mechanical force provided by the motor 22 and motor shaft 23. In these instances, the mechanical force of the output device 24 defines a drive parameter. The drive parameter characterizes properties of the mechanical force transmitted to the driven modules by the output device 24, such as torque, speed, etc. The output device 24 may have drive parameter that is indicative of a ratio of an input speed to an output speed, also known as a drive ratio. The drive ratio is not particularly limited. Alternatively, the output device 24 may have a ratio of input torque to output torque. By converting the input speed and/or input torque received from the motor shaft 23 of the motor 22, the output device 24 ensures that the mechanical force imparted to the driven modules satisfies the drive requirements of the first and second emergency patient motion devices. The drive parameter may additionally characterize a ratio of input revolutions to an output distance, such as an output device comprising a lead screw or a mechanical linkage.

Figure 6:
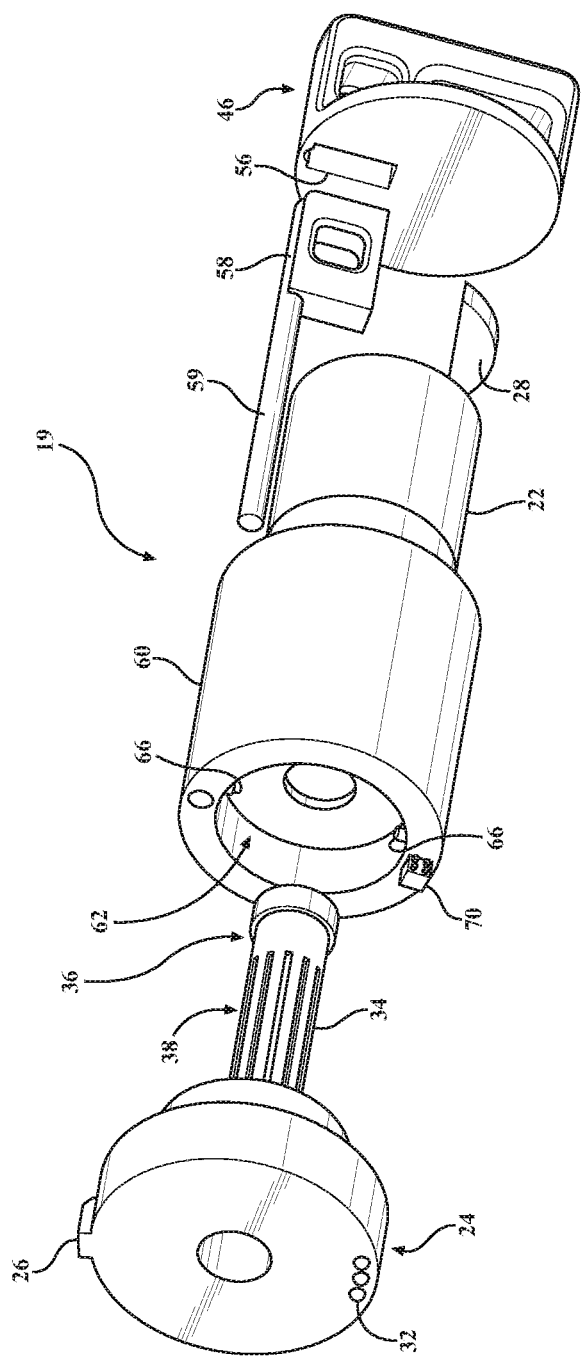
FIG. 6 is an exploded view of the modular drive assembly of FIG. 5 from a rear perspective.
Figure 9:
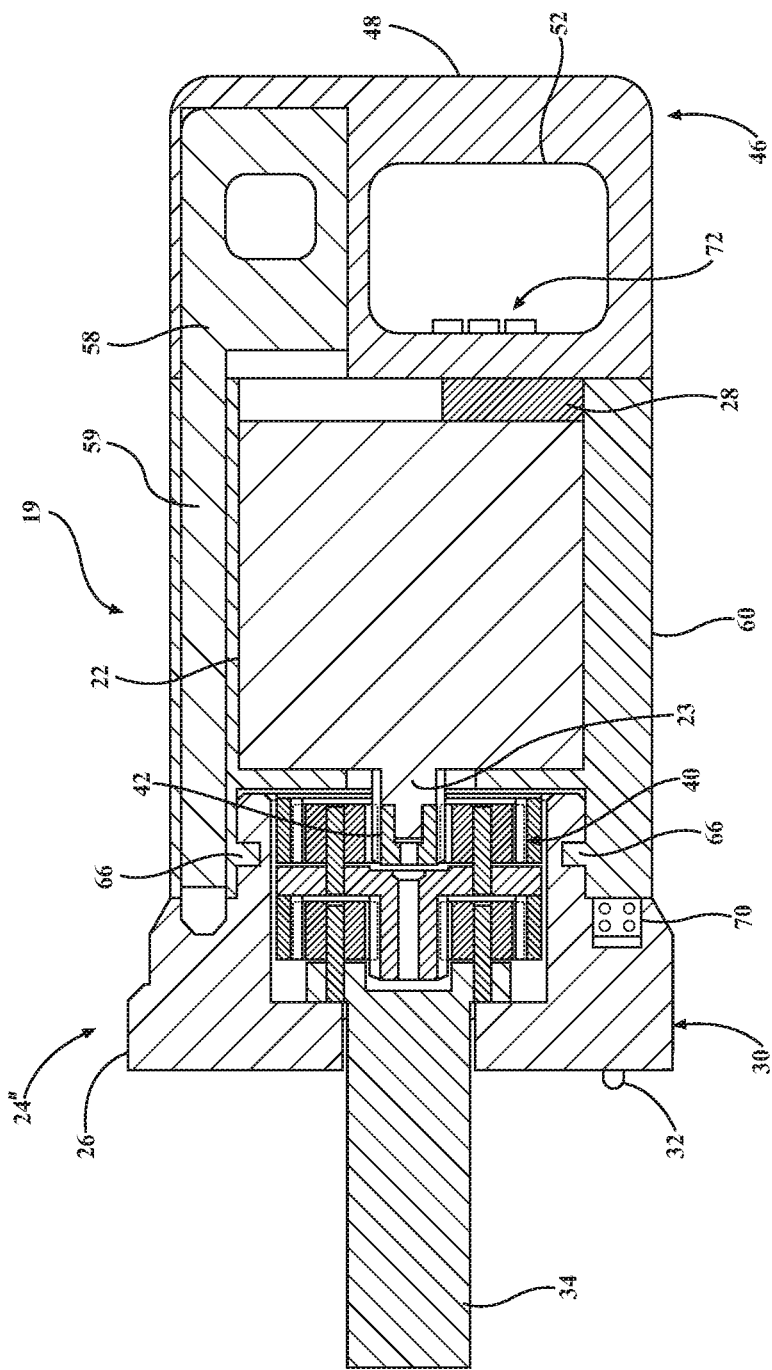
FIG. 9 is cross-sectional view of the modular drive assembly of FIG. 8.

The patient motion system may include multiple output devices in combination with a single motor and several emergency patient motion devices. In such an embodiment, each output device 24 may be removed from the motor and replaced with a different output device (such as shown in FIG. 9) that has a more suitable drive parameter for the selected emergency patient motion device. This configuration may allow a single motor to couple to different output devices and achieve any necessary drive parameter to drive the emergency patient motion devices included in the patient motion system. For example, the patient motion system 10 may include two, three, or more output devices per motor. For example, the first output device 24 (such as shown in FIGS. 5-7) may be configured to impart a first drive parameter and the second output device 24" (such as shown in FIGS. 8 and 9) may be configured to impart a second drive parameter, where the first and second drive parameters are different from one another. It is also contemplated that the emergency patient motion system may include fewer output devices than motors.

Referring to FIG. 12, the mount coupler 26 is mounted on the output device 24 and is configured to removably couple the modular drive device 20 to the driven module 14. In the illustrated embodiment, the mount coupler 26 comprises a tab 26 that protrudes from an outer surface 30 of the output device 24. When the modular drive device is coupled to the first driven module 14, the output device 24 is inserted into the drive mount 99a and the mount coupler 26 engages with the bayonet slot 106. The output device 24 is rotated to secure the mount coupler 26 in the bayonet slot 106, thereby securing the modular drive device 20 to the driven module 14 of the first emergency patient motion device. Of course, it is also contemplated that the mount coupler 26 may be mounted to other parts of the modular drive assembly 19 so long as the mount coupler 26 functions to removably engage the drive mount 99a of the first driven module 14. Furthermore, while one exemplary configuration of the mount coupler 26 is illustrated with the tab 26 engaging the bayonet slot 106, other designs are contemplated, such as a detent lock, a magnetic coupler, etc. so long as the mount coupler 26 is capable of removably engaging and optionally, locking, to the drive mount 99a of the first driven module 14.

Figure 3:
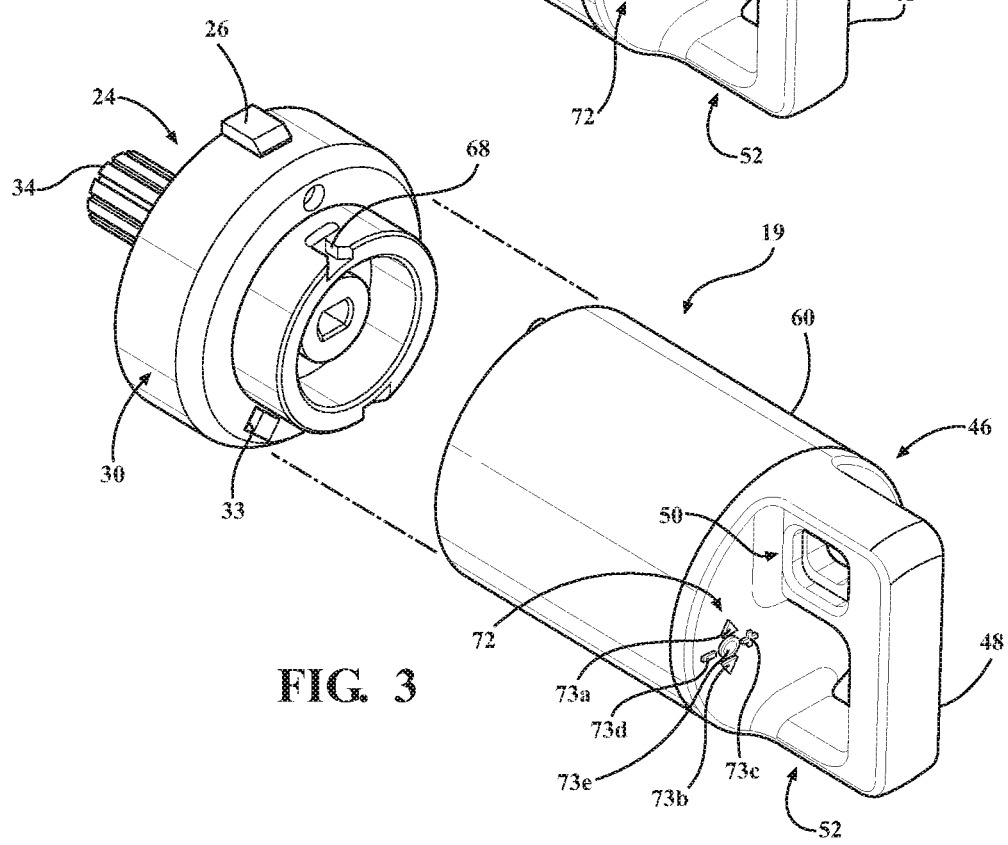
FIG. 3 is a partially exploded view of the front of the modular drive assembly of FIG. 2, showing an output device spaced apart from an energy storage device and a housing.
Figure 3B:
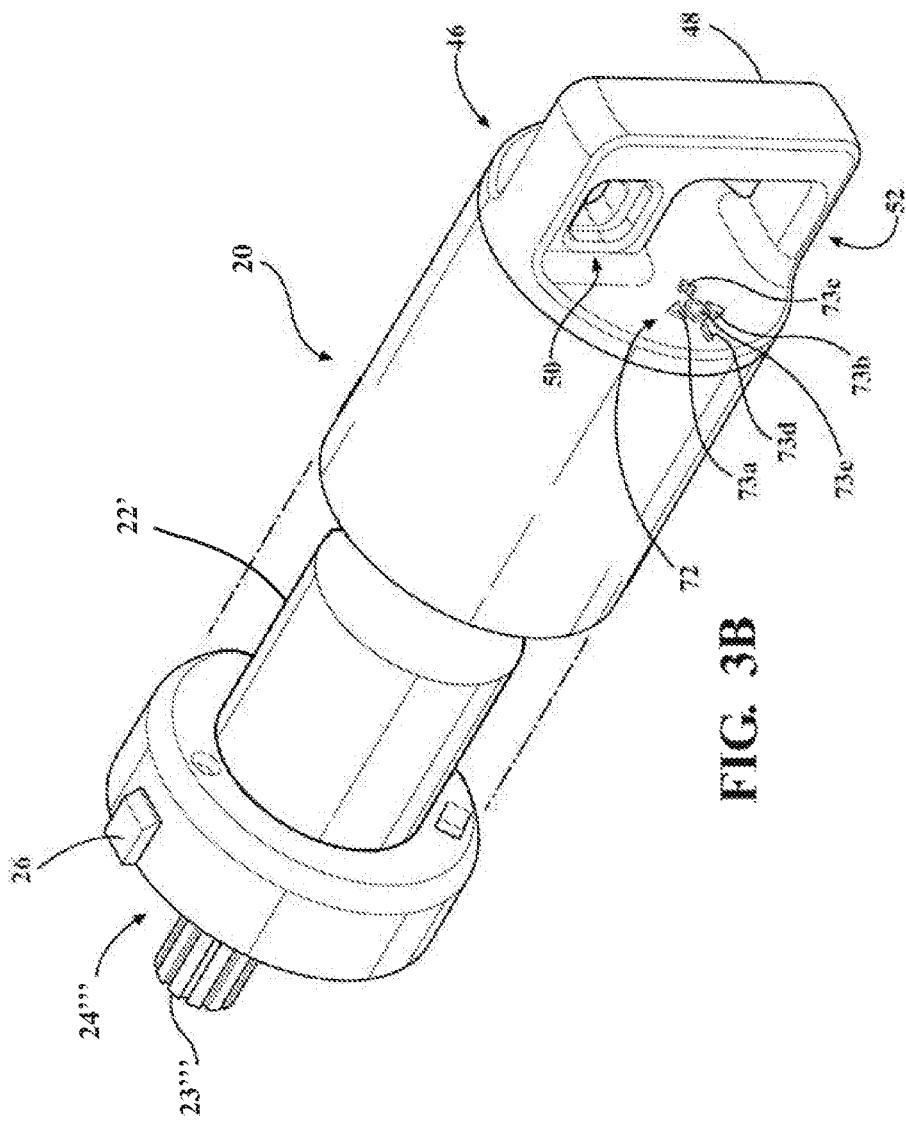
FIG. 3B is a partially exploded view of another embodiment of the modular drive device, showing an output device integrated with a motor and spaced apart from a housing.

Referring now to FIG. 3B, another embodiment of the modular drive device is illustrated with the output device 24''' integrated with the motor 22', i.e., no separate motor shaft is included. The output device 24''' is engageable with the driven module of the emergency patient motion device. The mount coupler 26 is coupled to the output device 24''' and configured to couple the modular drive device 20 to the drive mount 99. In this embodiment, the motor 22' transfers torque through the output device 24''' to power the driven module.

Referring now to FIG. 4, the output device 24 may further comprise a first electrical contact 32. The first electrical contact 32 is arranged on the outer surface of the output device 24 such that the first electrical contact 32 engages the electrical connector 109 of the drive mount 99a when the modular drive device is coupled to the driven module (see FIG. 12). Contact between the first electrical contact 32 and the electrical connector 109 allows control signals and power to directly pass from the first emergency patient motion device 12 to the controller 28, and vice versa. The emergency patient motion device may receive power from the modular drive assembly 19 to power auxiliary devices, such as a user input 74 (see FIG. 2) of the emergency patient motion devices, through the connection of first electrical contact 32 and electrical connector 109. Alternatively, the emergency patient motion device may comprise auxiliary devices such as lights that are powered by the modular drive assembly. Of course, it is also contemplated that signals can be passed from the controller 28 to the emergency patient motion devices through wireless means.

Referring again to FIGS. 5 and 6, in certain embodiments, the output device 24 may further comprise a second electrical contact 33. The second electrical contact 33 is arranged to engage with another electrical connector 70. Contact between the second electrical contact 33 and the electrical connector 70 allows control signals to be exchanged between the first emergency patient motion device 12 and the controller 28, by means of a direct electrical connection, through the connector 32 on the output device 24.

As shown in FIGS. 2-7, the output device 24 may further comprise an output member 34. Referring specifically to FIG. 5, in the embodiment shown, the output member 34 is configured to transmit mechanical force to the driven modules in order to perform the patient motion functions of the respective emergency patient motion devices. The output member 34 has a proximal end 36 and a distal end 38, with the proximal end 36 configured to engage with the motor shaft 23 of the motor 22. The distal end 38 of the output member 34 is configured to engage with the driven modules 14, 18 of the emergency patient motion devices 12, 16. The distal end 38 of the output member 34 has a splined profile engageable with the drive member 100a to transmit rotary motion to either driven module 14, 18. However, the output member 34 may assume any suitable configuration operable to transmit mechanical force to the driven modules 14, 18. Furthermore, the dimensions of the output member 34 are not particularly limited so long as they are configured to complement and engage the drive member of the corresponding emergency patient motion device.

Figure 10A:
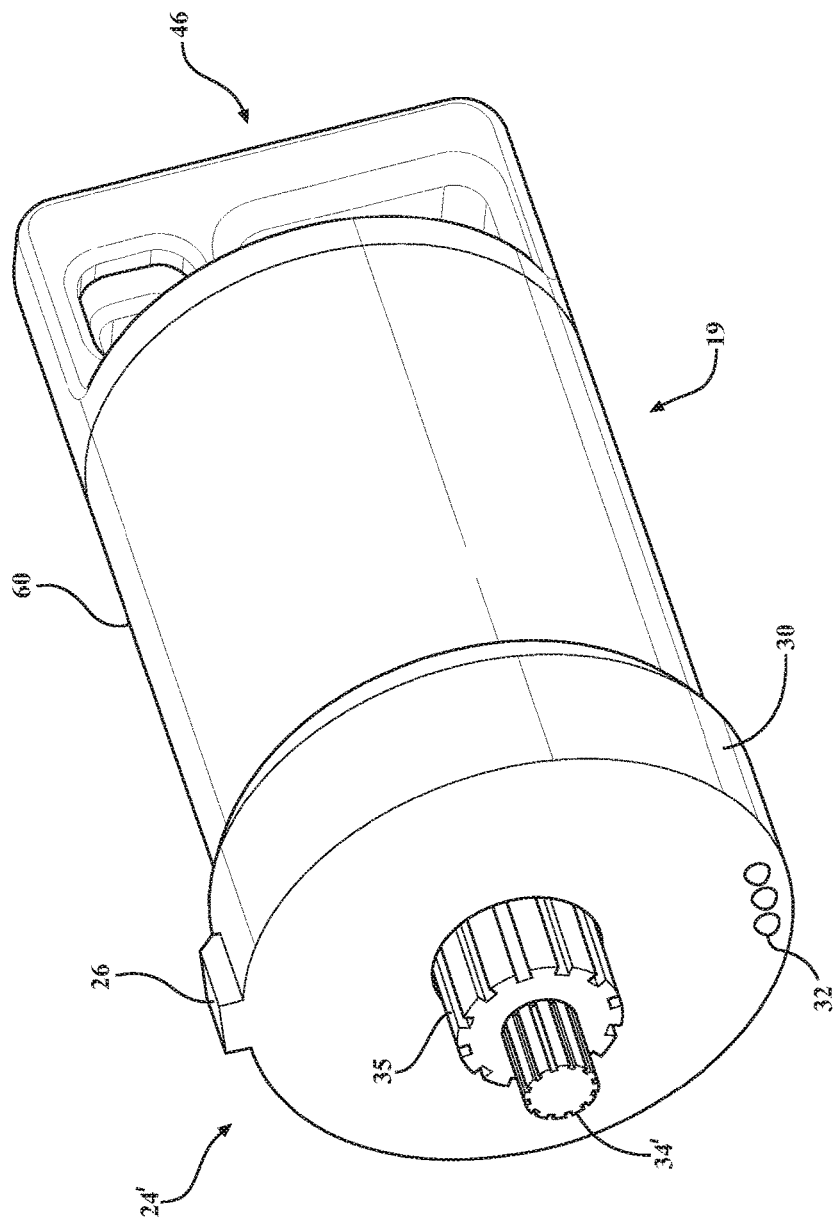
FIG. 10A is a perspective view of yet another embodiment of a modular drive assembly showing a two-stage output device including first and second output members.
Figure 10B:
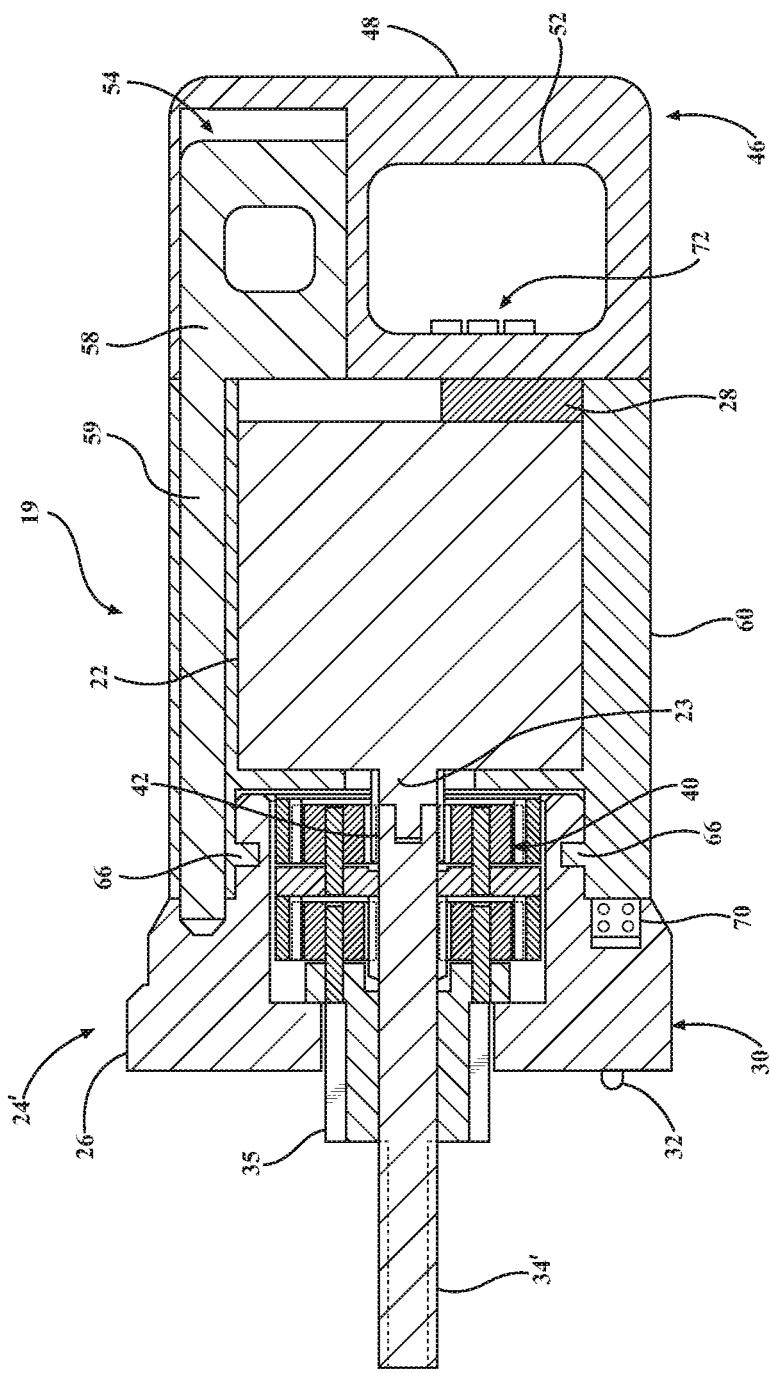
FIG. 10B is cross-sectional view of the modular drive assembly of FIG. 10A.

Referring to FIGS. 10A and 10B, a second embodiment of the output device 24', such as a two-stage output device 24' is shown. In such a configuration, the output device 24' comprises a first output member 34' and a second output member 35, with the second output member 35 being different from the first output member 34'. As shown in FIG. 10A, the first output member 34' may have a different drive parameter than the second output member 35, e.g. the first output member 34' rotates at a speed greater than the second output member 35. While the illustrated embodiment shows a mechanism where the first output member 34' is configured to rotate independently of the second output member 35, other two-stage output device designs are contemplated.

Referring now to the sectional view of the second embodiment of the output device 24' in FIG. 10B, the output device 24' comprises a transmission 40. The second output member 35 is coupled to the transmission 40 while the first output member 34' is coupled directly to the motor shaft 23 and is rotatably disposed through the transmission 40. The drive parameter of the first output member 34' is not modified by the transmission 40 and operates with a drive parameter equal to the output parameter of the motor shaft 23.

The second output member 35 may be configured to operate simultaneously with the first output member 34'. In other words, the motor may be configured to simultaneously rotate the first output member 34' and the second output member 35. Alternatively, the first output member 34' and the second output member 35 may be selectively engaged, i.e., may be configured such that only one of the first output member 34' and the second output member 35 rotates during operation.

The two-stage output device 24' is configured to cooperate with driven modules of emergency patient motion devices that have complementary drive member configurations (not shown). In such configurations (not shown), one of the emergency patient motion devices includes a driven module that is configured to receive input only from the output member 34', whereas another emergency patient motion device includes a second driven module that is configured to receive input only from the second output member 35.

As shown in FIGS. 8 and 9, in a third embodiment, the output device 24" may further comprise a transmission 40'. The transmission 40' may be operatively coupled to the output member 34" and to the motor shaft 23. More particularly, the transmission 40' comprises an input shaft 42 coupled to the motor shaft 23. The input shaft 42 is operatively coupled to the transmission 40" operatively coupled to the output member 34" such that torque applied to the input shaft 42 is transferred through the transmission 40' to the output member 34". The transmission 40' is configured to control the drive parameter of the output device 24" such that the drive requirements of the driven modules are satisfied. In other words, in one exemplary configuration, if the operation parameter, such as a torque, of the motor shaft 23 was not sufficient to drive the driven module, the transmission 40' may convert rotational speed of the motor shaft 23 to additional torque via the output member 34". Accordingly, the transmission 40' allows the output device 24" to achieve various drive parameters, i.e., converts motion imparted by the motor shaft 23 to a different speed or torque.

The transmission 40' may comprise a planetary gear assembly 40' in certain embodiments. In other embodiments, the transmission 40' may be any suitable configuration to at least partially transfer torque between the motor shaft 23 and the output member 34". By way of non-limiting example, the transmission 40' may be realized as a multi-speed gear assembly, a belt and pulley assembly, or a continuously variable transmission.

Figure 2:
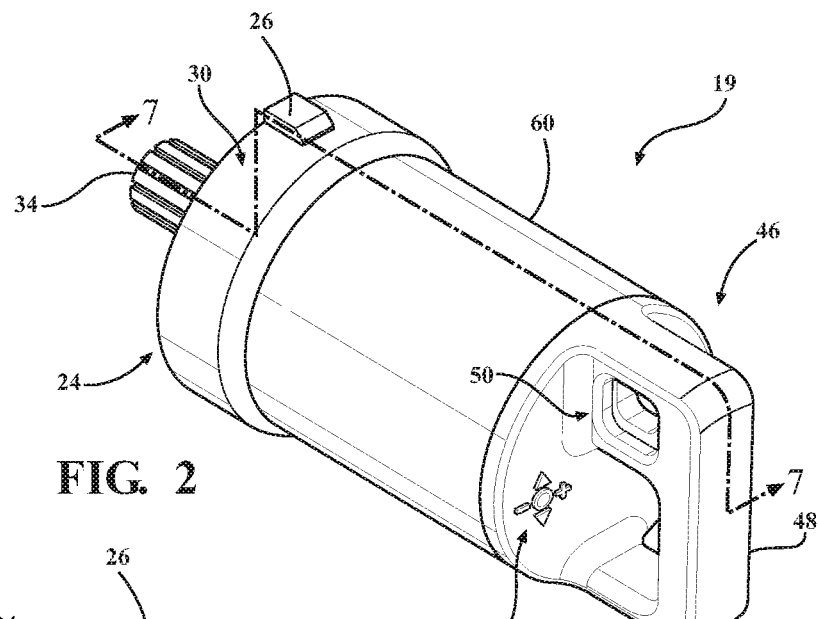
FIG. 2 is a perspective view of the modular drive assembly of FIG. 1.

Referring now to FIG. 2, the modular drive assembly 19 further comprises an energy storage device 60. The energy storage device 60 is coupled to the modular drive device 20 to form the modular drive assembly 19. The energy storage device 60 may provide power to the motor and/or the controller. The energy storage device 60 comprises a battery in one embodiment. The energy storage device 60 may further comprise more than one cell electrically coupled to one another in order to increase storage capacity of the energy storage device 60. The battery may be a Lithium-ion type battery, however other types of battery such Nickel-Cadmium, or Lithium polymer are also considered.

The energy storage device 60 may be further configured to be rechargeable with a charging assembly connected to a mains power supply or an external battery pack (not shown). The external battery pack may be integrated with the emergency patient motion device in order to recharge or increase capacity of the energy storage device 60. In one embodiment, the energy storage device 60 may comprise an electrical port (not shown) that allows the energy storage device 60 to receive power from the charging assembly. While the port may assume various configurations, in one exemplary embodiment, the electrical port comprises a USB port. In another embodiment, the energy storage device 60 may be configured to be wirelessly recharged via an inductive charging circuit.

The energy storage device 60 is configured to provide energy to the motor 22 and/or the controller 28. Thus, when the energy storage device 60 is electrically coupled to the motor 22, the module drive assembly 19 can power the emergency patient motion devices 12, 16 in a cordless manner. When the energy storage device 60 is mechanically coupled to the modular drive device 20, the energy storage device 60 is placed in electrical communication with the motor 22 and/or the controller 28. This electrical communication can be wireless, such as with an inductive power circuit, or wired, with one or more conductors.

As shown in FIGS. 2-7, the modular drive device 20 may further comprise a housing 46. The energy storage device 60 is configured to be removably mounted to the housing 46 and the output device 24 at each end of the energy storage device 60, as will be described below. In the illustrated embodiment, the housing 46 takes the form of a cylindrical cap that is configured to be secured to the energy storage device 60 with a finger latch 58 described below. Of course, other housing configurations are also contemplated, including those having different shapes or designs.

Referring now to FIGS. 5 and 6, the housing 46 may further comprise a handle 48 to carry the modular drive device 20. The handle 48 defines a first aperture 50 and a second aperture 52. An internal slot 54 (see FIG. 7) is defined in the housing 46 and intersects with the first aperture 50. The internal slot 54 extends through the housing 46 and defines a third aperture 56 in the housing 46 opposite the handle 48. The housing 46 may further comprise a finger latch 58 slidably disposed in the internal slot 54 and movable between a latched position and an unlatched position. The finger latch 58 has an elongate portion 59 engageable with the output device 24 to secure the output device 24 to the housing 46, as will be discussed below. Such securing also functions to keep the energy storage device 60 and motor 22 fixed relative to one another. However, other means of securing the output device 24 to the housing 46 are also contemplated.

As shown in FIGS. 5 and 6, in one exemplary embodiment, the energy storage device 60 assumes a hollow shape, such as a cylinder, defining a void 61. The battery cells (not shown) may be disposed within the energy storage device 60 with each cell arranged circumferentially around the void 61. The motor 22 may be at least partially disposed within the void 61. The energy storage device 60 cooperates with the housing 46 to enclose the motor 22 in the central void 61. It is contemplated that the energy storage device 60 may be removably coupled to the modular drive device 20 in other manners.

As shown in FIGS. 4 and 6, the energy storage device 60 may define an output device coupler 62 at one end to couple the output device 24 to the energy storage device 60. In the illustrated embodiment, the output device coupler 62 comprises a bayonet peg 66 configured to engage with a complimentary bayonet slot 68 defined in the output device 24. When the output device 24 is coupled to the energy storage device 60, the motor shaft 23 is engaged with the output device 24 such that mechanical force may be transferred to the output member 34. The output device 24 is slid into the void with the bayonet slot 68 aligned with the bayonet peg 66. The output device 24 is rotated to secure the bayonet peg 66 in the bayonet slot 68, thereby securing the output device 24 to the energy storage device 60. Of course, it is also contemplated that the output device 24 may be mounted to other parts of the modular drive assembly 19 so long as the output device coupler 62 functions to removably engage the motor shaft 23 with the output device 24. Furthermore, while one exemplary configuration of the output device coupler 62 is illustrated with the bayonet peg 66 engaging the bayonet slot 68, other designs are contemplated, such as a detent lock, a magnetic coupler, etc.

Referring to FIGS. 5 and 7 according to the illustrated embodiment, the output device 24 is secured to the housing 46 by sliding the finger latch 58 into the latched position (FIG. 7). In the latched position, a distal end of the elongate portion 59 is inserted into a latch receiver 63 defined in the output device 24. The elongate portion 59 prevents the output device 24 from rotating relative to the housing 46, which subsequently prevents the bayonet slot 68 from disengaging from the bayonet peg 66.

In the unlatched position (shown in FIG. 9), the distal end of the elongate portion 59 is disengaged from the output device 24" which allows the output device 24" to rotate and be disengaged from the output device coupler 62, and thus, be de-coupled from the housing 46. Removing the output device 24" allows a different output device to be coupled to the motor, or allows the energy storage device 60 to be removed from the housing 46.

As illustrated in FIG. 7, the controller 28 of the modular drive device 20 may be disposed in a barrier created by the housing 46 and the energy storage device 60 and, may be in electrical communication with the motor 22. Of course, it is contemplated that the controller 28 may be disposed at other locations in the modular drive assembly 19. Alternatively still, the controller 28 may be mounted to each of the emergency patient motion devices 12, 16 and communicate wirelessly with the motor 22. In such an embodiment, the modular drive device may be free of a controller that controls operation of the motor 22.

The controller 28 may be operable to control the motor 22 to operate in a first motor mode and a second motor mode. The first motor mode corresponds to the drive requirements of the first driven module and the second motor mode corresponds to the drive requirements of the second driven module, and may be stored in a memory device, stored onboard the controller 28. In other words, when the controller 28 operates the motor 22 in the first motor mode, the motor 22 rotates the motor shaft 23 such that the motor shaft 23 provides mechanical force to the first driven module that satisfies the drive requirements of that first driven module, whereas, when the controller 28 operates the motor 22 in the second motor mode, the motor 22 rotates the motor shaft 23 such that the motor shaft 23 provides mechanical force to the second driven module that satisfies the drive requirements of that second driven module. Such an embodiment is particularly useful where no output device is being used with the motor 22, or when the output device 24 does not modify the torque or speed of the motor shaft 23. Of course, the controller 28 may store any number of motor modes, but typically stores one motor mode for the different set of drive requirements in the emergency patient motion system. Thus, in one configuration, the controller 28 may control the motor 22 in a specific motor mode that corresponds with the operation of the emergency patient motion device. Such a configuration of the controller 28 may be especially useful in embodiments where the output device 24 does not include a transmission.

The controller 28 may be configured to store a first set of target parameters and a second set of target parameters, corresponding to first and second motor modes, respectively. The target parameters may be derived from inputs of the emergency patient motion device such as a patient weight, a desired height, or a speed. The controller 28 receives the inputs from the emergency patient motion device and using values stored in the controller 28, determines a target parameter. Based on the target parameter, the controller 28 operates the motor 22 in a designated motor mode. Said differently, the first motor mode of the controller 28 corresponds to a first set of target parameters, the second motor mode of the controller 28 corresponds to a second set of target parameters, and wherein the first set of target parameters and the second set of target parameters are stored in memory, and wherein the controller 28 is configured to control one of the motor 22 and the output device 24 to one of the first set of target parameters and the second set of target parameters. Of course, it should be appreciated that the controller may be configured to store any number of sets of target parameters, with each set of target parameters corresponding to the drive requirements of the emergency patient motion device. It should further be appreciated that the first and second motor modes may at times overlap. The controller 28 may also at times operate in an automatic mode which tailors the operation of the motor to match the target parameters of the emergency patient motion device.

Referring again to FIGS. 2 and 3, the modular drive assembly 19 may further comprise a first user input device 72 in electrical communication with the controller 28. The first user input device 72 may be disposed on the exterior of the housing 46 such that the first user input device 72 allows the user to control the operation of the modular drive device 20 and, therefore, operation of the emergency patient motion device to which the modular drive device is coupled. In the embodiment shown, the first user input device 72 comprises buttons 73*a-e* that control the operation of the modular drive device by having the controller send an appropriate signal to the motor. Each button 73*a*, 73*b* may control the direction of rotation of the motor of the modular drive device, which in turn performs a function of the driven module to which the modular drive device is coupled.

For example, referring to FIGS. 1 and 3, when the modular drive device is coupled to the first emergency patient motion device 12, button 73*a* may correspond to rotating the motor shaft in a clockwise direction, which in turn, raises a litter 84 of the first emergency patient motion device 12. Button 73*b* may correspond to rotating the motor shaft in a counter-clockwise direction, which in turn, lowers the litter 84 for the first emergency patient motion device 12.

The first user input device 72 may further comprise buttons 73*c* and 73*d*, which respectively correspond to increasing and decreasing the speed at which the motor 22 operates, thereby affecting the rate at which the driven modules 14, 18 operate. For example, when the modular drive device is coupled to the first emergency patient motion device 12, depressing one of buttons 73*c*, 73*d* changes the rate at which litter 84 is raised and lowered.

In another embodiment, referring to FIGS. 1 and 3, when the modular drive assembly 19 is coupled to the second emergency patient motion device 16, button 73*a* may correspond to rotating the motor shaft 23, and thereby the output member 34, in a clockwise direction, which in turn, drives a track assembly 18 of the second emergency patient motion device 16 in a forwards direction. Button 73*b* may correspond to rotating the motor shaft, and thereby output member 34, in a counter-clockwise direction, which in turn, drives the track assembly 18 of the second emergency patient motion device 16 in a reverse direction.

In addition, depressing one of buttons 73*c*, 73*d* changes the rate at which the track assembly 18 moves the second emergency patient motion device 16, i.e., the speed of the motor.

Button 73*e* may function as a power button for the user to turn the motor on and off. Other functions may be assigned to each of the buttons 73*a-e* according to which of the emergency patient motion devices the modular drive device 20 is coupled. Any suitable button configuration is contemplated.

The emergency patient motion system 10 may further comprise one or more additional user input devices, which may optionally be in communication with the controller 28. For example, with reference to FIGS. 11A and 11B, the first emergency patient motion device 12 further comprises a second user input device 74. The second user input device 74 may be in wireless or wired communication with the controller 28 of the modular drive device such that the second user input device 74 allows the user to control the modular drive device by causing the controller 28 to send output signals to the motor 22 based on the actuation of the second user input device 74. In this manner, the user could either actuate the first user input device 72 or the second user input device 74 to control the operation of the modular drive device.

The second user input device 74 may include the same buttons as the first user input device 72, or may include different buttons. In certain configurations, the modular drive assembly 19 is free of a user input device, and the operation of the modular drive device is solely controlled by the second user input device 74, i.e., the user input device that is included with each of the first and second emergency patient motion devices 12, 16. As such, the second user input device 74 may be coupled to the emergency patient motion device or may be wireless, such as a hand-held control pad or tablet. The second user input device may be used to control any number of emergency patient motion devices. Furthermore, it is contemplated that the second user input device may assume different configurations for each emergency patient motion device; e.g., the first emergency patient motion device may include a second user input device that is different from the second user input device included in the second emergency patient motion device.

The first and second user input devices 72, 74 may comprise other devices capable of being actuated by a user, such as the caregiver or the patient. Each user input device may be configured to be actuated in a variety of different ways, including but not limited to, mechanical actuation (hand, foot, finger, etc.), hands-free actuation (voice, foot, etc.), and the like. Each user input device may comprise a button, a gesture sensing device for monitoring motion of hands, feet, or other body parts of the caregiver (such as through a camera), a microphone for receiving voice activation commands, a foot pedal, and a sensor (e.g., a pressure sensor, an infrared sensor such as a light bar or light beam to sense a user's body part, ultrasonic sensor, etc.). Additionally, the buttons/pedals can be physical buttons/pedals or virtually implemented buttons/pedals such as through optical projection or on a touchscreen. The buttons/pedals may also be mechanically connected or drive-by-wire type buttons/pedals where a user applied force actuates a sensor, such as a switch or potentiometer. Further, the user input device may also be located on a portable electronic device (e.g., iPhone®, iPad®, or similar electronic devices).

Figure 15:
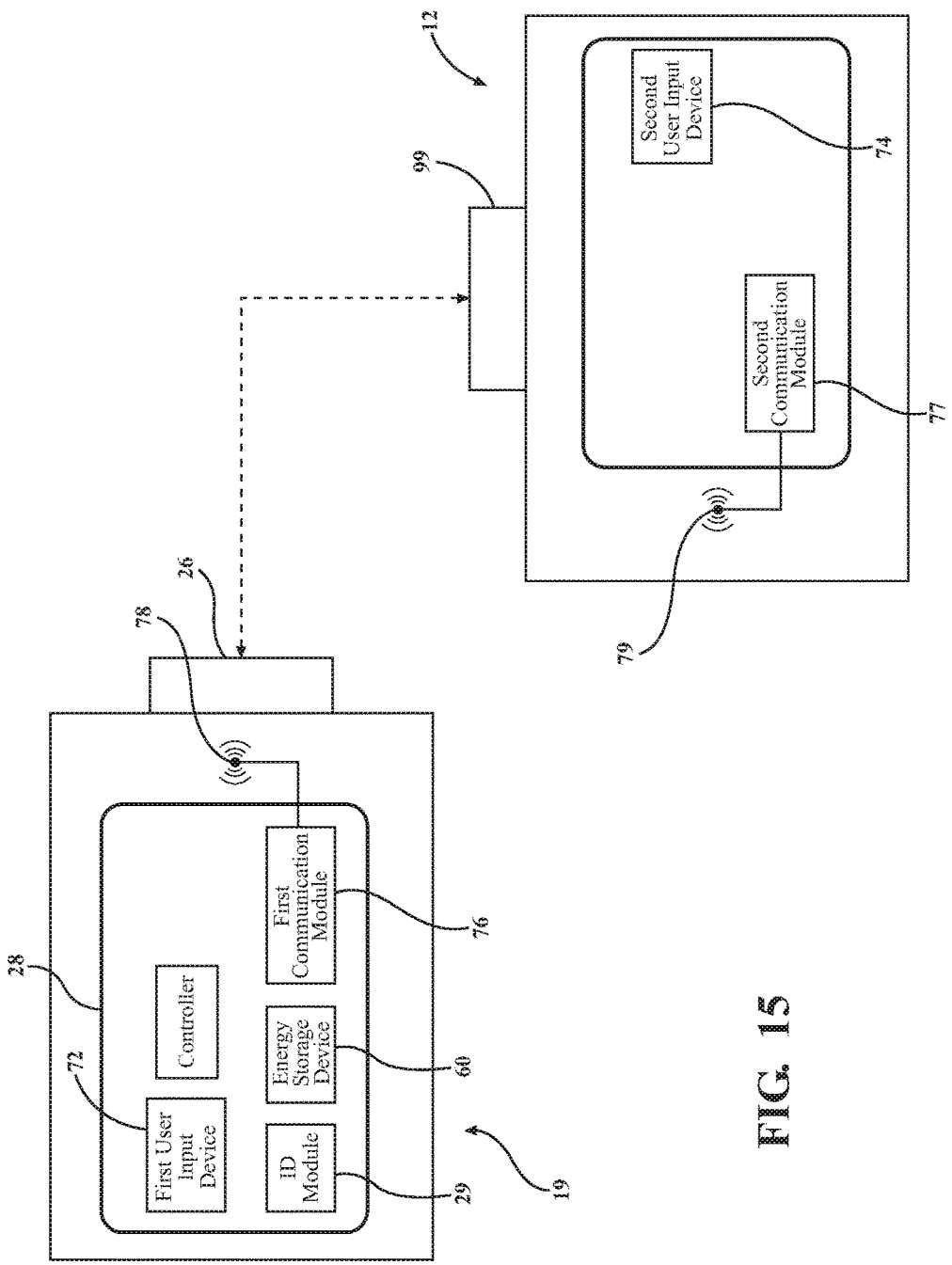
FIG. 15 is a schematic view of the modular drive device and the first emergency patient motion device of FIG. 1.

Referring to FIG. 15, in those embodiments where the second user input device 74 communicates wirelessly with the controller 28, the modular drive device 20 may further comprise a first communication module 76 coupled to the controller 28. The first communication module 76 is configured to receive control signals from the first user input device 72 and transmit these control signals to the controller 28 to operate the motor 22. In one particular embodiment, the first communication module 76 comprises a wireless antenna 78 to send and/or receive wireless control signals. The wireless antenna 78 may be any device capable of utilizing any wireless transmission protocol at any frequency or wavelength of the electromagnetic spectrum at any amplitude, including but not limited to FM, AM, radio frequency (RF), infrared (IR), cellular, 3G, 4G, Bluetooth, Bluetooth low power, Wi-Fi, RFID, near-field communication (NFC), VHF, UHF, analog, digital, one way, two way, and combinations thereof.

Referring to FIG. 15, the first emergency patient motion device 12 may further comprise a second communication module 77. The second communication module 77 is configured to wirelessly transmit control signals from the second user input device 74 to the controller 28, such that user input signals received from the second user input device 74 may be transmitted to the controller 28 to control the operation of the motor. The second communication module 77 may further comprise a second wireless antenna 79 to transmit the control signals. The second wireless antenna 79 may be any device capable of utilizing any wireless transmission protocol, at any frequency or wavelength of the electromagnetic spectrum at any amplitude, including but not limited to FM, AM, radio frequency (RF), infrared (IR), cellular, 3G, 4G, Bluetooth, Bluetooth low power, Wi-Fi, RFID, near-field communication (NFC), VHF, UHF, analog, digital, one way, two way, and combinations thereof. Of course, it is contemplated that other emergency patient motion devices, such as the second emergency patient motion device 16 may also comprise the second communication module 77.

The modular drive device may further comprise an identification module 29. In the illustrated embodiment, the identification module 29 is configured to identify which of either the first or second emergency patient motion devices the modular drive device is coupled to, and control the modular drive device in the optimal manner. More particularly, the identification module 29 could determine whether the modular drive device is coupled to first emergency patient motion device or the second emergency patient motion device, and control the motor based on that determination with a speed, torque, and/or power adapted for that determined emergency patient motion device. It should be appreciated that the identification module 29 is configured to identify any number of and any type of emergency patient motion device. Additionally, the identification module 29 may identify the emergency patient motion device by type, such that each type of emergency patient motion device is operated in a manner consistent with other emergency patient motion devices that are the same type. Alternatively, the identification module may identify each emergency patient motion device individually such that each emergency patient motion device is associated with a unique set of target parameters.

In certain embodiments, the controller 28, based on the identified emergency patient motion device detected, can automatically control the operation of the motor 22 in the preferred mode, i.e., the first motor mode or the second motor mode, accordingly. Alternatively, the controller 28 may comprise an identification module 29 configured to identify which of the emergency patient motion devices 12, 16 the modular drive device 20 is coupled to. The identification module 29 identifies the coupled emergency patient motion device and allows the controller 28 to select the motor mode corresponding to the drive requirements of that coupled emergency patient motion device.

The emergency patient motion system 10 may comprise an identifier (not shown), such as an RFID tag, or other type of identifier capable of communication with the identification module 29, such as an RFID reader on the modular drive device. The identifier may be coupled to each of the emergency patient motion devices, with each identifier being unique among types of emergency patient motion devices.

The controller 28 may operate in either the first motor mode or the second motor mode to provide a control signal to the motor 22 to operate in such a way that the operation parameter is equal to the drive requirements. In the first motor mode, the controller 28 provides a first signal to one of the motor 22 and the output device 24 to control the motor 22 or the output device 24 based on the drive requirements of the first driven module 14, and wherein in the second motor mode, the controller 28 provides a second signal to one of the motor 22 and the output device 24 based on the drive requirements of the second driven module 18. The first signal may vary from the second signal in the following characteristics: voltage, amperage, frequency, or combinations thereof. Alternatively, the controller 28 operates in either the first output mode or the second output mode to provide a control signal to the output device 24 to operate in such a way that the drive parameter is equal to the operation parameter, which may affect operation of the transmissions described above. In such an embodiment, the output device may comprises an electronic shifter which receives control signals from the controller 28 to vary the drive ratio of the output device.

The controller 28 may utilize feedback from sensors (not shown) coupled to the modular drive device, or the output device, to ensure that the motor or output device is operated in accordance with the desired operation parameter. For example, a speed sensor may be configured to sense the speed of the output member during operation. The sensor communicates the speed of the output member to the controller. The controller may adjust the speed of the motor, and thus, the output member such that the desired value is achieved. Alternatively, the controller 28 may operate in an open loop configuration without feedback from the sensors.

Figure 11A:
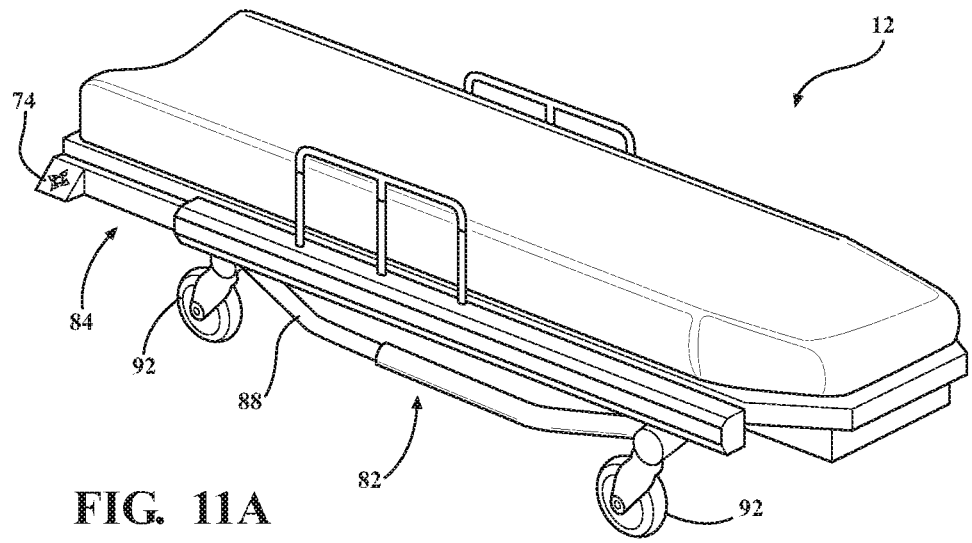
FIG. 11A is a perspective view of the first emergency patient motion device of FIG. 1 in a lowered position.
Figure 11B:
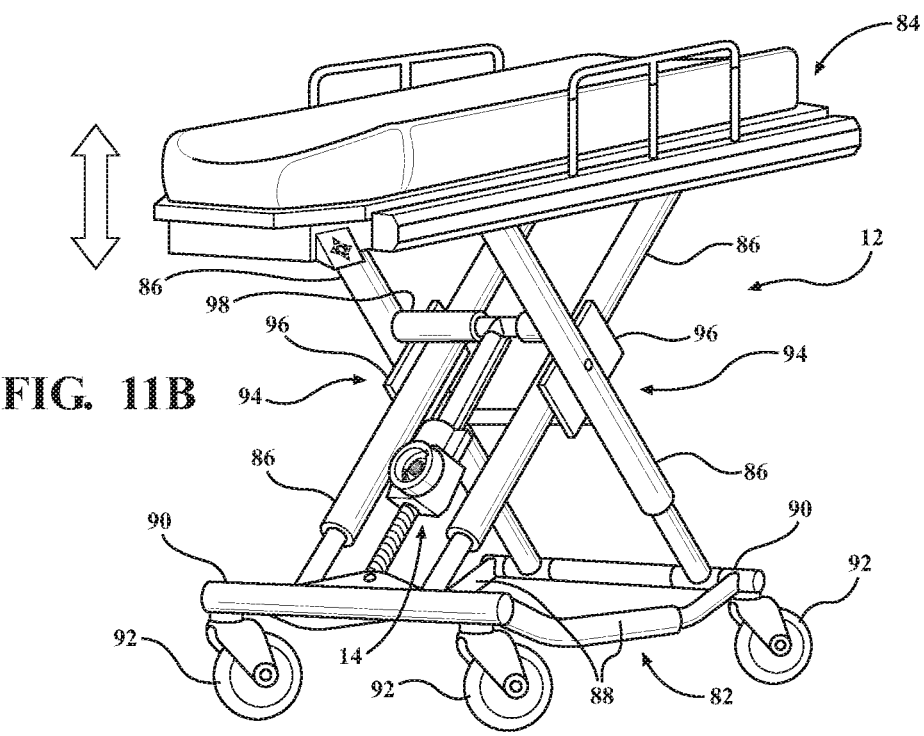
FIG. 11B is a perspective view of the first emergency patient motion device of FIG. 1 in a raised position.

In one embodiment, the first emergency patient motion device 12 is a patient stretcher 12. Referring to FIGS. 11A and 11B, while the configuration of the stretcher 12 is not particularly limited, in this exemplary embodiment, the stretcher 12 may comprise a base 82, a litter 84, and litter support arms 86 interconnecting the base 82 to the litter 84. The base 82 comprises a pair of longitudinal frame members 88 and a pair of lateral frame members 90. The longitudinal frame members 88 and the lateral frame members 90 are connected at each end to form a generally rectangular frame such that pairs of frame members are parallel to one another. The base 82 further comprises wheels 92, which allow the stretcher 12 to move over a surface. In the embodiment shown, one wheel 92 is swivelably coupled to each end of the lateral frame members 90.

As described above, the litter 84 is configured to change elevation relative to the base 82. More specifically, the litter 84 is movable into a raised position and a lowered position, with the litter 84 being spaced farther from the base 82 in the raised position than in the lowered position. In some instances, a mattress may be disposed on the litter 84 such that a patient rests directly on the mattress, and the mattress defines a patient support surface. As shown in FIGS. 11A and 11B, the second user input device 74 may be coupled to the litter 84 of the stretcher. However, the second user input device 74 may be mounted to the stretcher 12 in other locations, such as the base, siderails, etc.

Each support arm 86 comprises a first end pivotally coupled to the litter 84 and a second end pivotally coupled to the lateral frame member 90. The litter support arms 86 are arranged into two support pairs 94, each comprising two litter support arms 86. Each support pair 94 further comprises a support arm bracket 96 coupled the litter support arms 86. The support arm brackets 96 arrange the litter support arms 86 of each support pair 94 in an X-frame arrangement. The litter support arms 86 are coupled to the support arm brackets 96 such that the litter support arms 86 pivot relative to each other when the litter 84 is raised or lowered. A support arm cross member 98 extends laterally between each of the support arm brackets 96. The support arm cross member 98 supports each support pair 94 in a generally parallel arrangement.

Each of the litter support arms 86 is telescopic such that the litter 84 may be raised or lowered. When a user raises the litter 84, the litter support arms 86 become shorter. Likewise, when the litter 84 is lowered, the litter support arms 86 become longer. Alternatively, the base 82 may be raised or lower relative to the litter 84, such as the case when the first emergency patient motion device 12 is loaded into an ambulance.

As illustrated in FIGS. 11B and 12, the first driven module 14 takes the form of a lifting device 14. The lifting device 14 further comprises a threaded rod 116. The threaded rod 116 is slidably disposed in the lifting device 14 and configured to change a length of the lifting device 14. The lifting device 14 has a first end and a second end, with the first end coupled to the lateral frame member 90 of the base 82, and the second end coupled to the support arm cross member 98. The lifting device 14 is extendable from a first position into a second position, with the first position corresponding to the lowered position of the litter 84 (as shown in FIG. 11A) and the second position corresponding to the raised position of the litter 84 (as shown in FIG. 11B). Of course, any type of lifting device may be utilized with the first emergency patient motion device 12, such as a column lift, a hydraulic lift, an electric actuator, etc.

Referring again to FIG. 12 in the illustrated embodiment, the drive member 100a is rotatably supported in the cavity 102. The drive member 100a comprises a pinion shaft 110 and a pinion 112. In one embodiment, the pinion shaft 110 comprises a tubular section defining an internal spline joint 114 protruding from the pinion 112. The internal spline joint 114 transmits rotary motion from the pinion shaft 110 to the pinion 112. The pinion 112 may be a bevel gear, however other types of gears, such as worm gears, hypoid gears, or spur gears are also contemplated.

The lifting device 14 further comprises a ring gear 118 operatively coupled to the pinion 112. The ring gear 118 defines a threaded bore operable with the threaded rod 116. The ring gear 118 is rotatably supported in the first driven module 14 for rotation about the threaded rod 116. The modular drive device rotates the pinion 112 causing the ring gear 118 to rotate. Rotation of the ring gear 118 converts the mechanical force from the modular drive device 20 from rotation to linear displacement of the threaded rod 116. Linear displacement of the threaded rod relative to the ring gear 118 changes the length of the lifting device 14.

It should be appreciated that drive member may comprise other mechanisms suitable to receive mechanical energy from the modular drive device and perform the designated patient motion function. For example, as an alternative to the gear mechanism described above, mechanical energy be transmitted through other mechanisms such as a belt and pulley or a sprocket and chain, whereby the modular drive device 20 provides a motive force to cause movement of the driven module.

It is also contemplated that the drive member may be configured to drive additional systems without a pinion. The pinion shaft may be configured to directly drive the driven module. For example, the pinion shaft may be coupled to a pump to pressurize a fluid, or to a mechanical linkage to produce cyclical motion used to perform a patient motion function.

Figure 13:
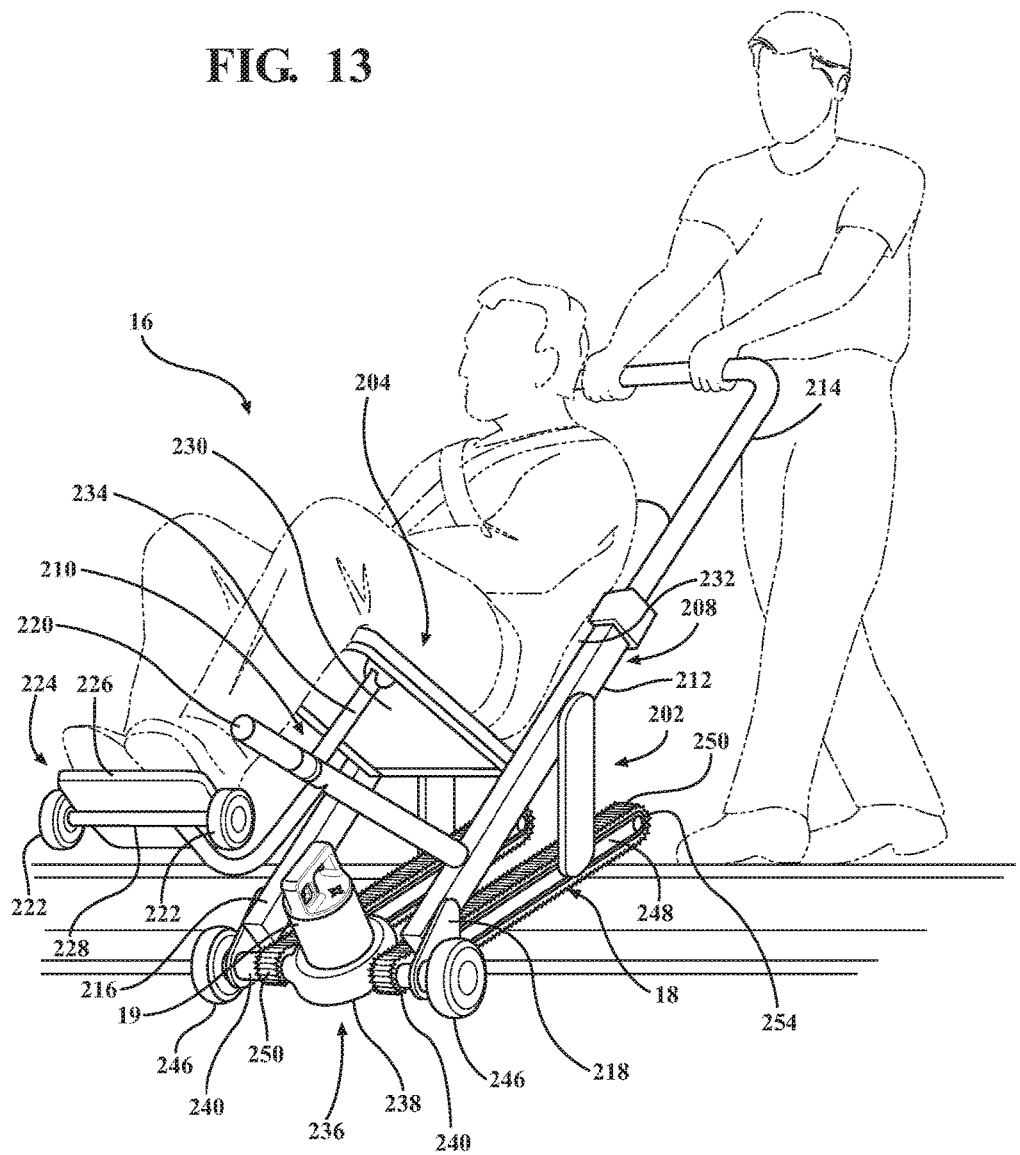
FIG. 13 is a close-up perspective view of the second emergency patient motion device and the modular drive assembly of FIG. 1, with the modular drive assembly coupled to the second emergency patient motion device.
Figure 14:
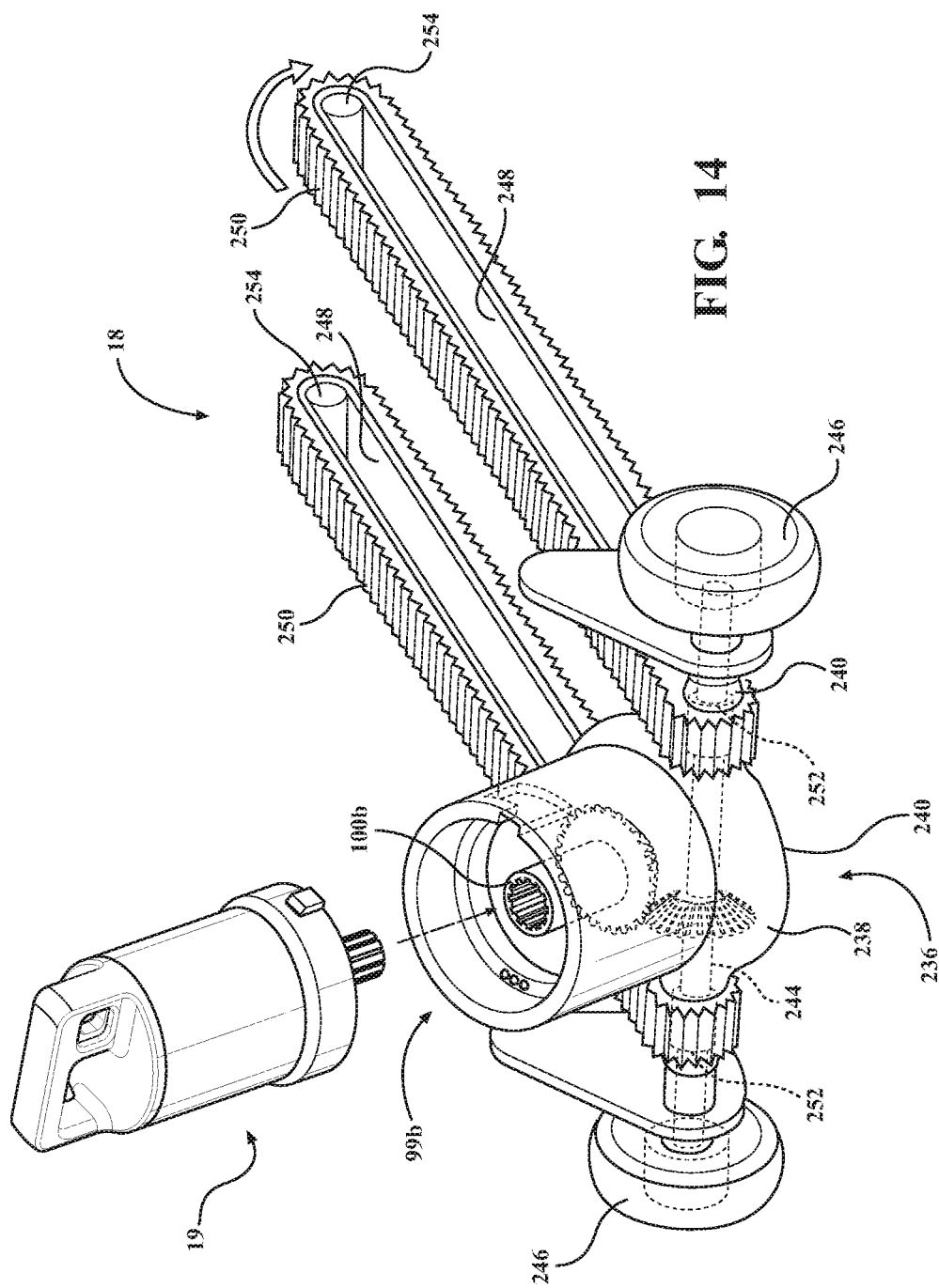
FIG. 14 is a close-up perspective view of the driven module for the second emergency patient motion device of FIG. 13, with the modular drive assembly of FIG. 1 spaced apart from one another.

Certain embodiments of the second emergency patient motion device 16 may take the form of a stair climber 16. As illustrated in FIGS. 13 and 14, the second driven module 18 takes the form of a track assembly 18. While the configuration of the stair climber 16 is not particularly limited, in the illustrated embodiment, the stair climber 16 comprises a support frame 202 and a patient support 204. The patient support 204 is coupled to the support frame 202 and configured to support the patient. The track assembly 206 supports the patient support 204 when ascending or descending stairs.

The support frame 202 comprises a back support 208 and a lower support 210. The back support 208 includes a pair of longitudinally extending frame rails 212 joined by a guide handle 214 and a lateral frame rail 216. A frame mount 218 is coupled to each of the longitudinally extending frame rails 212 opposite of the guide handle 214.

The lower support 210 comprises a pair of lower frame rails 220 each coupled to one of the frame mounts 218. The lower frame rails 220 extend substantially perpendicular to the longitudinally extending frame rails 212. A wheel 222 is coupled to each of the lower frame rails 220. The lower support 210 further comprises a foot rest 224 coupled to the lower frame rails 220. The foot rest 224 includes a tread plate 226 and a foot bar 228. The tread plate 226 is tiltably coupled to the foot bar 228. The tread plate 226 supports the patient's feet while seated on the stair climber 16.

The patient support 204 comprises a seat bottom 230 and a seat back 232. A rear portion of the seat bottom 230 is coupled to the longitudinally extending frame rails 212. A pair of seat bottom struts 234 extend between the lower frame rails 220 and the seat bottom 230. The seat back 232 is coupled to the longitudinally extending frame rails 212 and supports the patient's back while seated on the stair climber 16.

The track assembly 18 of the stair climber 16 enables a user to transport a patient up and down stairs. The track assembly 18, when driven by the modular drive device 20, assists the user by powering the stair climber 16 up the stairs, and by braking the stair climber 16 when traveling down the stairs. As such, the stair climber 16 enables the user to transport the patient in a controlled manner both up and down the stairs.

The track assembly 18 is coupled to the frame mounts 218. The track assembly 18 comprises an axle 236. The axle 236 comprises a center section 238 and two tube sections 240. Referring now to FIG. 14, the center section 238 comprises a drive mount 99b and a drive member 100b. A drive shaft 244 is rotatably supported in the axle 236 and operatively coupled to the drive member 100b. Rotation of the drive member 100b by the modular drive device rotates the drive shaft 244.

The track assembly 18 further comprises a track carriage 248 and a track belt 250. Each track carriage 248 has a length such that the track assembly 206 may contact two or more stairs simultaneously. The track belt 250 is disposed around the track carriage 248. The track assembly 206 further comprises a roller 254 that is rotatably coupled to the track carriage 248 and supports the track belt 250. The track belt 250 is configured to rotate in a loop around the track carriage 248.

The axle assembly 236 further comprises a drive sprocket 252 that is operatively coupled to the drive shaft 244. Additionally, the drive sprocket 252 is operatively coupled to the track belt 250. Rotation of the drive sprocket 252 by the drive shaft 244 causes the track belt 250 to rotate about the track carriage 248, thereby moving the stair climber 16 up or down the stairs.

The axle 236 further comprises a pair of drive wheels 246 each rotatably coupled to one of the tube sections 240. The drive wheels 246 are driven by the drive shaft 244 to propel the stair climber 16 along flat ground.

In some embodiments, the modular drive device comprises a flex controller. The flex controller is an integrated motor controller configured to support multiple motor types, motor drive algorithms, and feedback sensing types. For example, in some embodiments, the modular drive device may be utilized with different motors, such as brushed DC motors (2-phase), brushless DC motors (3-phase), linear actuators, rotary motors, solenoids, and the like. The motors may be modular such that the motors can be readily attached to and/or removed from the modular drive device in a plug-and-play fashion. Alternatively, the flex controller may be modular such that the flex controller can be readily attached to and/or removed from the modular drive device in a plug-and-play fashion. In other examples, the flex controller may be coupled to multiple independent motors. In multi-motor schemes, the motors may be the same or different. Each motor may be part of the modular drive device, or the emergency patient motion device. In other words, the modular drive device may comprise multiple motors each controlled by the flex controller. Alternatively, the emergency patient motion device may comprise the flex controller, which can be arranged such that the flex controller controls each of the motors when the modular drive device is coupled to the emergency patient motion device. In any of these instances, the same flex controller is configured to adapt to the one or more motors. As such, the flex controller provides a versatile solution to motor control for the modular drive device that reduces cost, maintenance effort, and re-design.

Additionally, with reference to FIG. 1, while the coordinated motion, speed, and interfacing requirements of the driven modules 14, 18 on the emergency patient motion devices 12, 16 may be the same regardless of the motor drive technology used, the driver level control and feedback systems may be completely different. As such, the flex controller provides an adaptable driver level control and feedback such that any suitable drive technology may be implemented without having to update the application layer.

The flex controller may be configured using any suitable hardware and/or software configurations. For example, the flex controller may be configured with redundant hardware modules, which may be configured to interface with different applications. The flex controller may further be configured to execute software that is compatible with different hardware modules. The flex controller may further comprise a memory device configured to store computer-readable software. The memory device may additionally contain a lookup table listing target parameters for different motor modes of the flex controller.

The flex controller is configured with settings for motor and feedback types that are independent from the application code thereby providing the flex controller 28 with a scalable, flexible architecture, that may be handled easily and that can be deployed as needed based on how many motors and of what type the product requires. The independent architecture may also allow multiple flex controllers to be implemented to control additional motors as needed.

The flex controller may also implement multiple coordinated motion algorithms. Such algorithms may control motor parameters such as speed, torque, current, force, and the like. The flex controller may comprise any suitable software and/or hardware design to facilitate coordination of multiple motion algorithms.

Additionally, the flex controller may be controlled as a master controller or as a slave device to a master controller. In some embodiments, the flex controller may include inputs that are accessible to and can be modified by an operator. For example, the flex controller may include any suitable switch inputs, sensing inputs, hardware jumpers, or the like, to change controller support for the motor types, motor drive algorithms, or feedback sensing schemes.

The flex controller may utilize different control strategies based the type of motor used, the desired output parameters of the motor, or other performance characteristics of the emergency patient motion device. Such control strategies may improve performance characteristics of the motors such as speed response, or braking performance. The speed response may comprise parameters such as how quickly or slowly the motor accelerates to the target speed. The braking performance may comprise parameters such as a level of braking force applied, and how quickly the braking force is applied.

The flex controller is configured at the driver layer with multiple drive techniques. For example, for brushed motors, the flex controller may be configured to control the motor in a locked anti-phase control mode. Locked anti-phase control utilizes a pulse width modulation (PWM) signal in order to control both speed and direction of the motor. The PWM signal is supplied to an H-bridge which causes the H-bridge to alternate polarity of a voltage potential provided to the motor between positive and negative values. The PWM signal controls an amount of time that the voltage potential is positive and the amount of time that the voltage potential is negative. The voltage that the motor receives can be averaged over time, and the resulting average voltage will control the speed of the motor. For example, a 50% duty cycle on the PWM signal will average to zero voltage and the motor will be stationary, a 0% duty cycle on the PWM signal will average to maximum negative voltage and the motor will operate at maximum reverse speed, and a 100% duty cycle on the PWM signal will average to maximum positive voltage and the motor will operate at maximum forward speed.

Additionally or alternatively, the flex controller may be configured to control brushed motors in a sign-magnitude control mode. Sign-magnitude control mode utilizes a PWM signal in order to control speed of the motor and a direction signal to control the direction of the motor. The PWM signal and the direction signal are supplied to an H-bridge which causes the H-bridge to alternate a voltage potential provided to the motor between on and off. The PWM signal controls an amount of time that the voltage potential is on (i.e. non-zero) and the amount of time that the voltage potential is off (i.e. zero). The direction signal controls whether the voltage potential provided to the motor is positive or negative. The voltage that the motor receives can be averaged over time, and the resulting average voltage will control the speed of the motor. For instance, a 0% duty cycle on the PWM signal will average to zero voltage and the motor will be stationary, a 100% duty cycle on the PWM signal will average to voltage and the motor will operate at maximum speed, with the direction signal controlling whether the motor operates in forward or reverse.

Additionally, the flex controller may further be configured to utilize a braking control, alone or in combination with the lock anti-phase control mode or the sign-magnitude control mode. The braking control can be either high-side or low-side. High-side braking switches the polarity of the voltage signal provided to the motor and powers the motor to rotate in the opposite direction. Low-side braking switches the value of the voltage signal provided to the motor to zero causing the motor to generate a voltage potential opposing the rotation of the motor.

Certain other control strategies are best utilized with brushless DC motors. For example, the flex controller may provide control for brushless DC motors having specific back electromotive force (BEMF) signals. Generally, the shape of the BEMF signal may be trapezoidal or sinusoidal shape. In addition to the BEMF, the phase current also follows a trapezoidal and sinusoidal shape. The flex controller may adapt to any of these motor parameters and may provide driving control using the same.

The flex controller may be utilized for other driving techniques, such as solenoid driving techniques, and more specifically, pulsed solenoid driving techniques, and the like. Additionally, the flex controller may be utilized for any other suitable driving techniques not specifically described herein.

The flex controller may additionally be configured to utilize one or more position sensors to sense the position of the motor as it rotates. In such a configuration, the position sensors may be in electrical communication with the flex controller 28. Electrical communication between the position sensors and the flex controller may be implemented via wireless or wired connection. The position sensor may any suitable configuration, such as a hall-effect sensor, a digital hall quadrature sensor, an analog potentiometer, an optical sensor, a magnetic sensor, a fixed position sensor, a recalibration sensor, or any combination thereof.

In embodiments where position sensors are utilized, the flex controller may be configured to sense the type of position sensor utilized, and automatically calibrate the position sensor. The automatic calibration of the position sensor ensures that the flex controller can determine the precise position of the motor based on the inputs form the calibrated position sensors. For example, if the motor is a brushless DC motor and the position sensor is a hall quadrature sensor, the flex controller determines what type of sensor is connected to sensor inputs, and the flex controller thereafter determines the proper calibration of the sensor. Those skilled in the art appreciate that the flex controller may have any other suitable structure or functions other than those described herein for supporting multiple motor types, motor drive algorithms, and feedback sensing types.

In certain embodiments referring to FIG. 1, each of the emergency patient motion devices 12, 16 may be manually driven until the modular drive device 20 is coupled thereto. In other words, the first and second emergency patient motion devices 12, 16 may be unpowered until the modular drive device is coupled thereto. Thus, the first and second emergency patient motion devices 12, 16 may be free of a motor, such as an electric motor, until the modular drive is coupled thereto. Thus, if an ambulance utilizes both the first and second emergency patient motion devices 12, 16 and the modular drive device, the user can select which of the emergency patient motion devices 12, 16 is needed, and couple the modular drive device 20 to the appropriate emergency patient motion device 12, 16. This type of system allows a single motor, i.e., the modular drive device, to be shared among two, three, four, or more emergency patient motion devices. This saves precious weight for the ambulance.

In embodiments where the emergency patient motion devices are unpowered, one or more of the emergency patient motion devices may further comprise a manual input device. The manual input device is configured to receive force from the user of the emergency patient motion device in order to cause the driven module to perform the patient motion function. In the embodiment where the emergency patient motion device is a stair climber 16 shown in FIG. 13, the manual input device is a guide handle 214. The guide handle 214 is coupled to the stair climber 16 and transfers a force applied by the user to move the stair climber 16 up and down the stairs. The user pulls the guide handle 214 to overcome gravity and guide the stair climber 16 on the stairs. Several types of manual input device are considered in connection with different emergency patient motion devices. For example, the manual input device may comprise a handle, a crank, a pedal, a level, or combinations thereof.

In addition to the manual input device, the modular drive device may further comprise a manual charging device (not shown). The manual charging device is configured to generate energy that may be used to power the modular drive device, or recharge the energy storage device. In one embodiment, the manual charging device may comprise a hand crank operable by the user to generate energy.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A modular drive device for driving a first driven module of a first emergency patient motion device or a second driven module of a second emergency patient motion device, the first driven module having different drive requirements from the second driven module, said modular drive device comprising:
   a motor having an operation parameter;
   an output device operatively coupled to and drivable by said motor to transmit mechanical force from said motor to the first driven module when said output device is coupled to the first emergency patient motion device and from said motor to the second driven module when said output device is coupled to the second emergency patient motion device, said output device having a drive parameter;
   a mount coupler coupled to said output device and configured to removably couple said modular drive device to each of the first emergency patient motion device and the second emergency patient motion device; and
   a controller in communication with one of said motor and said output device, said controller comprising an identification module configured to identify whether said modular drive device is coupled to the first emergency patient motion device or the second emergency patient motion device, with said controller being operable in a first motor mode when coupled to the first emergency patient motion device and a second motor mode when coupled to the second emergency patient motion device,
      wherein in said first motor mode, said controller provides a first signal to one of said motor and said output device to control said motor or said output device based on the drive requirements of the first driven module, and wherein in said second motor mode, said controller provides a second signal to one of said motor and said output device based on the drive requirements of the second driven module.

2. A modular drive device according to claim 1, further comprising a housing and an energy storage device, said energy storage device configured to be removably mounted to said housing, said energy storage device configured to provide energy to said motor and said controller.

3. A modular drive device according to claim 1, further comprising a memory device, wherein said first motor mode of said controller corresponds to a first set of target parameters, wherein said second motor mode of said controller corresponds to a second set of target parameters, and wherein said first set of target parameters and said second set of target parameters are stored in said memory device, and wherein said controller is configured to control one of said motor and said output device to one of said first set of target parameters and said second set of target parameters.

4. A modular drive device according to claim 3, wherein said controller is configured to automatically control one of said motor and said output device based on said identification module.

5. A modular drive device according to claim 1, wherein said operation parameter of said motor is selected from the group consisting of: speed, torque, direction, and combinations thereof.

6. A modular drive device according to claim 1, further comprising a user input device configured to control operation of the first driven module and the second driven module when said modular drive device is coupled to one of the first emergency patient motion device and the second emergency patient motion device.

7. A modular drive device according to claim 1, wherein said operation parameter of said motor and said drive parameter of said output device correspond to a characteristic of patient motion effected by the first and second emergency patient motion devices.

8. A reconfigurable emergency patient motion system, said system comprising:
   a modular drive device comprising:
      a motor,
      an output device operatively coupled to said motor, and
      a mount coupler coupled to said output device;
   a first emergency patient motion device comprising:
      a first driven module having a first drive requirement and configured to perform a first patient motion function, and
      a first drive module mounting assembly comprising a first drive mount and a first drive member; and
   a second emergency patient motion device comprising:
      a second driven module having a second drive requirement and movable to perform a second patient motion function, and
      a second drive module mounting assembly comprising a second drive mount and a second drive member;
   wherein said mount coupler is configured to be removably coupled to said first drive mount and said second drive mount such that said modular drive device powers said first driven module when said modular drive device is coupled to said first emergency patient motion device and said modular drive device powers said second driven module when said modular drive device is coupled to said second emergency patient motion device; and
   a controller in communication with one of said motor and said output device, said controller comprising an identification module configured to identify whether said modular drive device is coupled to said first emergency patient motion device or said second emergency patient motion device, with said controller being operable in a first motor mode when coupled to said first emergency patient motion device and a second motor mode when coupled to said second emergency patient motion device, wherein in said first motor mode, said controller provides a first signal to one of said output device based on the drive requirements of said first driven module, and wherein in said second motor mode, said controller provides a second signal to one of said motor and said output device based on the drive requirements of said second driven module.

9. A reconfigurable emergency patient motion system according to claim 8, wherein each of said first and second emergency patient motion devices is independently selected from the group consisting of a cot, a stair climber, a backboard lifter, a patient lift, and a transfer device.

10. A reconfigurable emergency patient motion system according to claim 8, wherein said first emergency patient motion device is different from said second emergency patient motion device.

11. A reconfigurable emergency patient motion system according to claim 10, wherein said first drive mount is the same as said second drive mount.

12. A reconfigurable emergency patient motion system according to claim 8, wherein said first signal comprises a 100% duty cycle pulse width modulation signal; and wherein said second signal comprises a 50% duty cycle pulse width modulation signal.

* * * * *